US008036899B2

(12) United States Patent
Sobol-Shikler

(10) Patent No.: US 8,036,899 B2
(45) Date of Patent: Oct. 11, 2011

(54) SPEECH AFFECT EDITING SYSTEMS

(76) Inventor: Tal Sobol-Shikler, Lehavim (IL)

( * ) Notice: Subject to any disclaimer, the term of this patent is extended or adjusted under 35 U.S.C. 154(b) by 1005 days.

(21) Appl. No.: 11/874,306

(22) Filed: Oct. 18, 2007

(65) Prior Publication Data

US 2008/0147413 A1 Jun. 19, 2008

(51) Int. Cl.
*G10L 11/00* (2006.01)
*G10L 13/00* (2006.01)
*G06F 17/27* (2006.01)

(52) U.S. Cl. ............................ 704/270; 704/9; 704/258

(58) Field of Classification Search ........................ None
See application file for complete search history.

(56) References Cited

U.S. PATENT DOCUMENTS

| | | | | |
|---|---|---|---|---|
| 5,327,521 A * | 7/1994 | Savic et al. | .................. | 704/272 |
| 7,373,294 B2 * | 5/2008 | Cezanne et al. | .............. | 704/207 |
| 2003/0033145 A1 * | 2/2003 | Petrushin | ...................... | 704/236 |
| 2003/0093280 A1 * | 5/2003 | Oudeyer | ....................... | 704/266 |

OTHER PUBLICATIONS

Shikler et al., "Affect Editing in Speech", ACII 2005, LNCS 3784, pp. 411-418, 2005.*

Fujisawa et al., "On the Role of Pitch Intervals in the Perception of Emotional Speech", ISCA & IEEE Workshop on Spontaneous Speech Processing and Recognition, Tokyo Institute of Technology, Tokyo, Japan, Apr. 13-16, 2003.*

Cook et al., "Evaluation of the Affective Valence of Speech Using Pitch Substructure", IEEE Transactions on Audio, Speech, and Language Processing, vol. 14, No. 1, Jan. 2006, pp. 142-151.*

Cook et al., "Application of a Psychoacoustical Model of Harmony to Speech Prosody", Speech Prosody 2004, Nara, Japan, Mar. 23-26, 2004.*

* cited by examiner

*Primary Examiner* — Brian Albertalli

(57) ABSTRACT

This invention generally relates to system, methods and computer program code for editing or modifying speech affect. A speech affect processing system to enable a user to edit an affect content of a speech signal, the system comprising: input to receive speech analysis data from a speech processing system said speech analysis data, comprising a set of parameters representing said speech signal; a user input to receive user input data defining one or more affect-related operations to be performed on said speech signal; and an affect modification system coupled to said user input and to said speech processing system to modify said parameters in accordance with said one or more affect-related operations and further comprising a speech reconstruction system to reconstruct an affect modified speech signal from said modified parameters; and an output coupled to said affect modification system to output said affect modified speech signal.

20 Claims, 9 Drawing Sheets

A)

B)

SPEECH AFFECT EDITING SYSTEMS

FIELD OF THE INVENTION

This invention generally relates to system, methods and computer program code for editing or modifying speech affect. Speech affect, is a term of art broadly speaking referring to the emotional content of speech.

BACKGROUND TO THE INVENTION

Editing affect (emotion) in speech has many desirable applications. Editing tools have become standard in computer graphics and vision, but speech technologies still lack simple transformations to manipulate expression of natural and synthesized speech. Such editing tools are relevant for the movie and games industries, for feedback and therapeutic applications, and more. There is a substantial body of work in affective speech synthesis, see for example the review by Schröder M. (Emotional speech synthesis: A review. In Proceedings of Eurospeech 2001, pages 561-564, Aalborg). Morphing of affect in speech, meaning regenerating a signal by interpolation of auditory features between two samples, was presented by Kawahara H. and Matsui H. (Auditory Morphing Based on an Elastic Perceptual Distance Metric, in an Interference-Free Time-Frequency Representation, ICASSP'2003, pp. 256-259, 2003). This work explored transitions between two utterances with different expressions in the time-frequency domain. Further results on morphing speech for voice changes in singing were presented by Pfitzinger (Auditory Morphing Based on an Elastic Perceptual Distance Metric, in an Interference-Free Time-Frequency Representation, ICASSP'2003, pp. 256-259, 2003), who also reviews other morphing related work and techniques.

However most of the studies explored just a few extreme expressions, and not nuances or subtle expressions. The methods that use prosody characteristics consider global definitions, and only a few integrate the linguistic prosody categorizations such as $f_0$ contours (Burkhardt F., Sendlmeier W. F.: Verification of Acoustical Correlates of Emotional Speech using Formant-Synthesis, ISCA Workshop on Speech \& Emotion, Northern Ireland 2000, p. 151-156; Mozziconacci S. J. L., Hermes, D. J.: Role of intonation patterns in conveying emotion in speech, ICPhS 1999, p. 2001-2004). The morphing examples are of very short utterances (one short word each), and a few extreme acted expressions. None of these techniques leads to editing tools for general use.

SUMMARY OF THE INVENTION

Broadly, we will describe a speech affect editing system, the system comprising: input to receive a speech signal; a speech processing system to analyse said speech signal and to convert said speech into speech analysis data, said speech analysis data comprising a set of parameters representing said speech signal; a user input to receive user input data defining one or more affect-related operations to be performed on said speech signal; and an affect modification system coupled to said user input and to said speech processing system to modify said parameters in accordance with said one or more affect-related operations and further comprising a speech reconstruction system to reconstruct an affect modified speech signal from said modified parameters; and an output coupled to said affect modification system to output said affect modified speech signal.

Embodiments of the speech affect editing system may allow direct user manipulation of affect-related operations such as speech rate, pitch, energy, duration (extended or contracted) and the like. However preferred embodiments also include a system for converting one or more speech expressions into one or more affect-related operations.

Here the word "expression" is used in a general sense to denote a mental state or concept, or attitude or emotion or dialogue or speech act—broadly non-verbal information which carries cues as to underlying mental states, emotions, attitudes, intentions and the like. Although expressions may include basic emotions as used here, they may also include more subtle expressions or moods and vocal features such as "dull" or "warm".

Preferred embodiments of the system that we will describe later operate with user-interaction and include a user interface but the skilled person will appreciate that, in embodiments, the user interface may be omitted and the system may operate in a fully automatic mode. This is facilitated, in particular, by a speech processing system which includes a system to automatically segment the speech signal in time so that, for example, the above-described parameters may be determined for successive segments of the speech. This automatic segmentation may be based, for example, on a differentiation of the speech signal into voiced and un-voiced portions, or a more complex segmentation scheme may be employed.

The analysis of the speech into a set of parameters, in particular into a time series of sets of parameters which, in effect, define the speech signal, may comprise performing one or more of the following functions: $f_0$ extraction, spectrogram analysis, smoothed spectrogram analysis, $f_0$ spectrogram analysis, autocorrelation analysis, energy analysis, pitch curve shape detection, and other analytical techniques. In particular in embodiments the processing system may comprise a system to determine a degree of harmonic content of the speech signal, for example deriving this from an autocorrelation representation of the speech signal. A degree of harmonic content may, for example, represent an energy in a speech signal at pitches in harmonic ratios, optionally as a proportion of the total (the skilled person will understand that in general a speech signal comprises components at a plurality of different pitches).

Some basic physical metrics or features which may be extracted from the speech signal include the fundamental frequency (pitch/intonation), energy or intensity of the signal, durations of different speech parts, speech rate, and spectral content, for example for voice quality assessment. However in embodiments a further layer of analysis may be performed, for example processing local patterns and/or statistical characteristics of an utterance. Local patterns that may be analysed thus include parameters such as fundamental frequency ($f_0$) contours and energy patterns, local characteristics of spectrals content and voice quality along an utterance, and temporal characteristics such as the durations of speech parts such as silence (or noise) voiced and un-voiced speech. Optionally analysis may also be performed at the utterance level where, for example, local patterns with global statistics and inputs from analysis of previous utterances may contribute to the analysis and/or synthesis of an utterance. Still further optionally connectivity among expressions including gradual transitions among expressions and among utterances may be analysed and/or synthesized.

In general the speech processing system provides a plurality of outputs in parallel, for example as illustrated in the preferred embodiments described later.

In embodiments the user input data may include data defining at least one speech editing operation, for example a cut, copy, or paste operation, and the affect modification may then be configured to perform the speech editing operation by performing the operation on the (time series) set of parameters representing the speech.

Preferably the system incorporates a graphical user interface (GUI) to enable a user to provide the user input data. Preferably this GUI is configured to enable the user to display a portion of the speech signal represented as one or more of the set of parameters.

In embodiments of the system a speech input is provided to receive a second speech signal (this may comprise a same or a different speech input to that receiving the speech signal to be modified), and a speech processing system to analyse this second speech signal (again, the above described speech processing system may be reused) to determine a second (time series) set of parameters representing this second speech signal. The affect modification may then be configured to modify one or more of the parameters of the first speech signal using one or more of the second set of parameters, and in this way the first speech signal may be modified to more closely resemble the second speech signal. Thus in embodiments, one speaker can be made to sound like another. To simplify the application of this technique preferably the first and second speech signals comprise substantially the same verbal content.

In embodiments the system may also include a data store for storing voice characteristic data for one or more speakers, this data comprising data defining an average value for one or more of the aforementioned parameters and, optionally, a range or standard deviation applicable. The affect modification system may then modify the speech signal using one or more of these stored parameters so that the speech signal comes to more closely resemble the speaker whose data was stored and used for modification. For example the voice characteristic data may include pitch curve or intonation contour data.

In embodiments the system may also include a function for mapping a parameter defining an expression onto the speech signal, for example to make the expression sound more positive or negative, more active or passive, or warm or dull, or the like.

As mentioned above, the affect related operations may include an operation to modify a harmonic content of the speech signal.

Thus in a related aspect the invention provides a speech affect modification system, the system comprising: an input to receive a speech signal; an analysis system to determine data dependent upon a harmonic content of said speech signal; and a system to define a modified said harmonic content; and a system to generate a modified speech signal with said modified harmonic content.

In a related aspect the invention also provides a method of processing a speech signal to determine a degree of affective content of the speech signal, the method comprising: inputting said speech signal; analyzing said speech signal to identify a fundamental frequency of said speech signal and frequencies with a relative high energy within said speech signal; processing said fundamental frequency and said frequencies with a relative high energy to determine a degree of musical harmonic content within said speech signal; and using said degree of musical harmonic content to determine and output data representing a degree of affective content of said speech signal.

Preferably the musical harmonic content comprises a measure of one or more of a degree of musical consonance, a degree of dissonance, and a degree of sub-harmonic content of the speech signal. Thus in embodiments a measure is obtained of the level of content, for example energy, of other frequencies in the speech signal with a relative high energy in the ratio n/m to the fundamental frequency where n and m are integers, preferably less than 10 (so that the other consonant frequencies can be either higher or lower than the fundamental frequency).

In one embodiment of the method the fundamental frequency is extracted together with other candidate fundamental frequencies, these being frequencies which have relatively high values, for example over a threshold (absolute or proportional) in an autocorrelation calculation. The candidate fundamental frequencies not actually selected as the fundamental frequency may be examined to determine whether they can be classed as harmonic or sub-harmonics of the selected fundamental frequency. In this way a degree of musical consonance of a portion of the speech signal may be determined. In general the candidate fundamental frequencies will have weights and these may be used to apply a level of significance to the measure of consonance/dissonance from a frequency.

The skilled person will understand the degree of musical harmonic content within the speech signal will change over time. In embodiments of the method the speech signal is segmented into voiced (and unvoiced) frames and a count is performed of the number of times that consonance (or dissonance) occurs, for example as a percentage of the total number of voiced frames. The ratio of a relative high energy frequency in the speech signal to the fundamental frequency will not in general be an exact integer ratio and a degree of tolerance is therefore preferably applied. Additionally or alternatively a degree of closeness or distance from a consonant (or dissonant) ratio may be employed to provide a metric of a harmonic content.

Other metrics may also be employed including direct measurements of the frequencies of the energy peaks, a determination of the relative energy invested in the energy peaks, by comparing a peak value with low average value of energy, (musical) tempo related metrics such as the relative duration of a segment of speech about an energy peak having pitch as compared with an adjacent or average duration of silence or unvoiced speech or as compared with an average duration of voiced speech portions. As previously mentioned, in some preferred embodiments one or more harmonic content metrics are constructed by counting frames with consonance and/or dissonance and/or sub-harmonics in the speech signal.

The above-described method of processing a speech signal to determine a degree of affective content may be employed for a number of purposes including, for example, to identify a speaker and/or a type of emotional content of the speech signal. As mentioned above, a user interface may be provided to enable the user to modify a degree of affective content of the speech signal to allow a degree of emotional content and/or a type of emotion in the speech signal to be modified.

In a related aspect the invention provides a speech affect processing system comprising: an input to receive a speech signal for analysis; an analysis system coupled to said input to analyse said speech signal using one or both of musical consonance and dissonance relations; and an output coupled to said analysis system to output speech analysis data representing an affective content of said speech signal using said one or both of musical consonance and musical dissonance relations.

The system may be employed, for example, for affect modification by modification of the harmonic content of the speech signal and/or for identification of a person or type or degree of emotion and/or for modifying a type or degree of emotion and/or for modifying the "identity" of a person (that is, for making one speaker sound like another).

The invention further provides a carrier medium carrying computer readable instructions to implement a method/system as described above.

The carrier may comprise a disc, CD- or DVD-Rom, program memory such as read only memory (firmware), or a data carrier such as an optical or electrical signal carrier. Code (and/or data) to implement embodiments of the invention may comprise source, object or executable code in a conventional programming language (interpreted or compiled) such as, for example, C or a variant thereof.

BRIEF DESCRIPTION OF THE DRAWINGS

These and other aspects of the invention will now be further described by way of example only, with reference to the accompanying figures in which.

$$\text{Pitch}=\text{SamplingFrequency}/\text{TimeDelay}(P);$$

Figure 8:
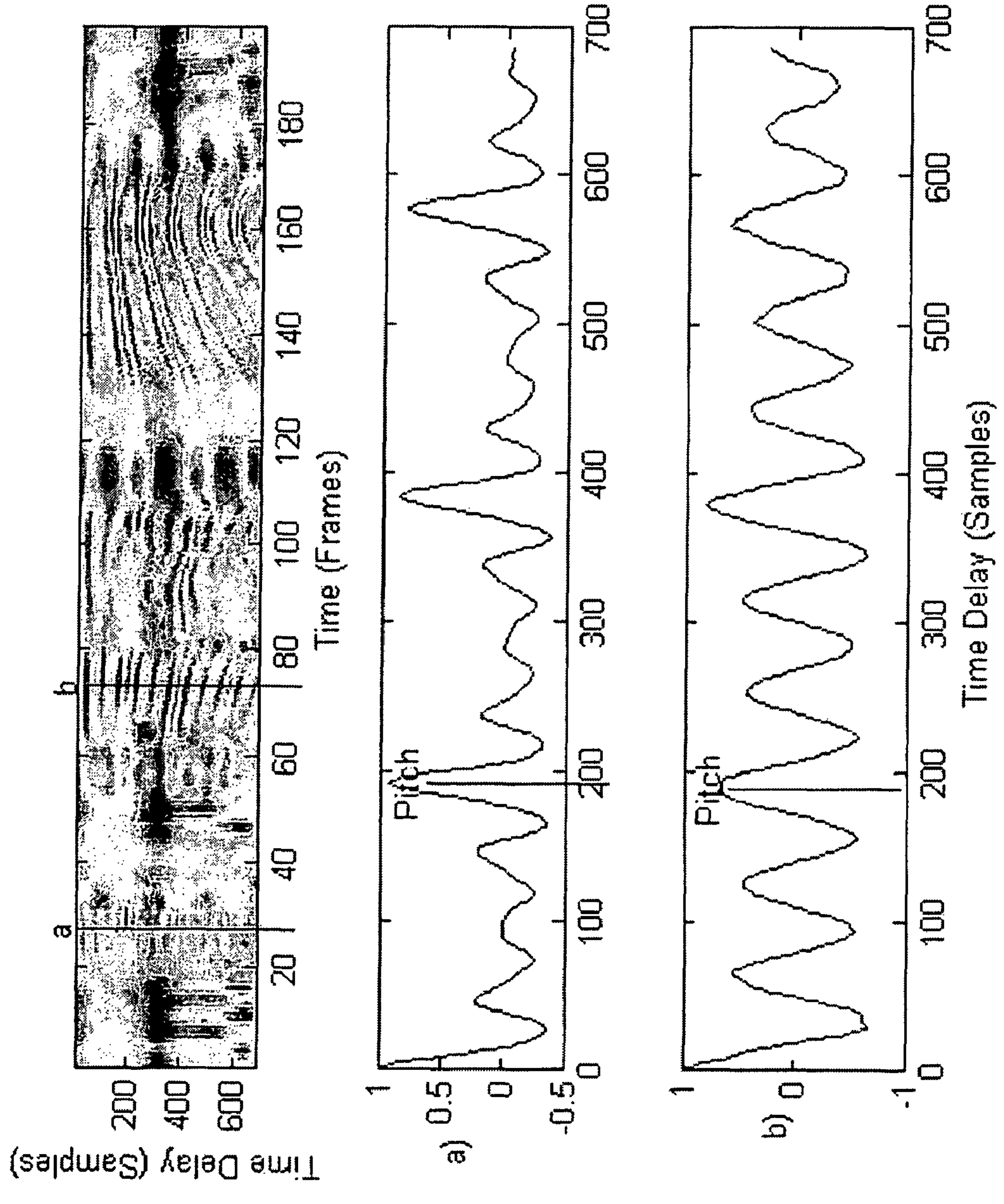

FIG. 8 shows harmonic intervals in the autocorrelation of expressive speech. The top figure is the autocorrelation of the whole speech signal, a) and b) are the autocorrelation at the time frames marked in the top figure; the time delay of the points marked as 'Pitch' are the points for which the pitch or fundamental frequency is calculated:

$$\text{FundamentalFrequency}=\text{SamplingFrequency}/\text{TimeDelay(Pitch)};$$

Figure 9:
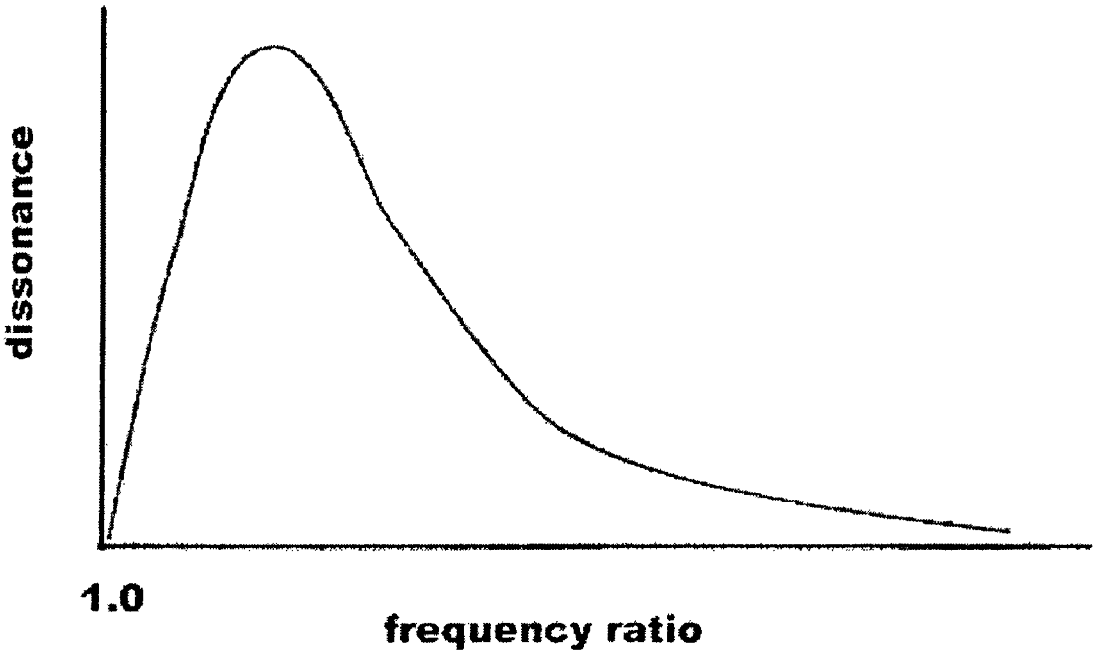

FIG. 9 shows dissonance as a function of the ration between two tones.

DETAILED DESCRIPTION OF PREFERRED EMBODIMENTS

Here we describe an editing tool for affect in speech. We describe its architecture and an implementation and also suggest a set of transformations of $f_0$ contours, energy, duration and spectral content, for the manipulation of affect in speech signals. This set includes operations such as selective extension, shrinking, and actions such as 'cut and paste'. In particular, we demonstrate how a natural expression in one utterance by a particular speaker can be transformed to other utterances, by the same speaker or by other speakers. The basic set of editing operators can be enlarged to encompass a larger variety of transformations and effects. We describe below the method, show examples of subtle expression editing of one speaker, demonstrate some manipulations, and apply a transformation of an expression using another speaker's speech.

Figure 1:
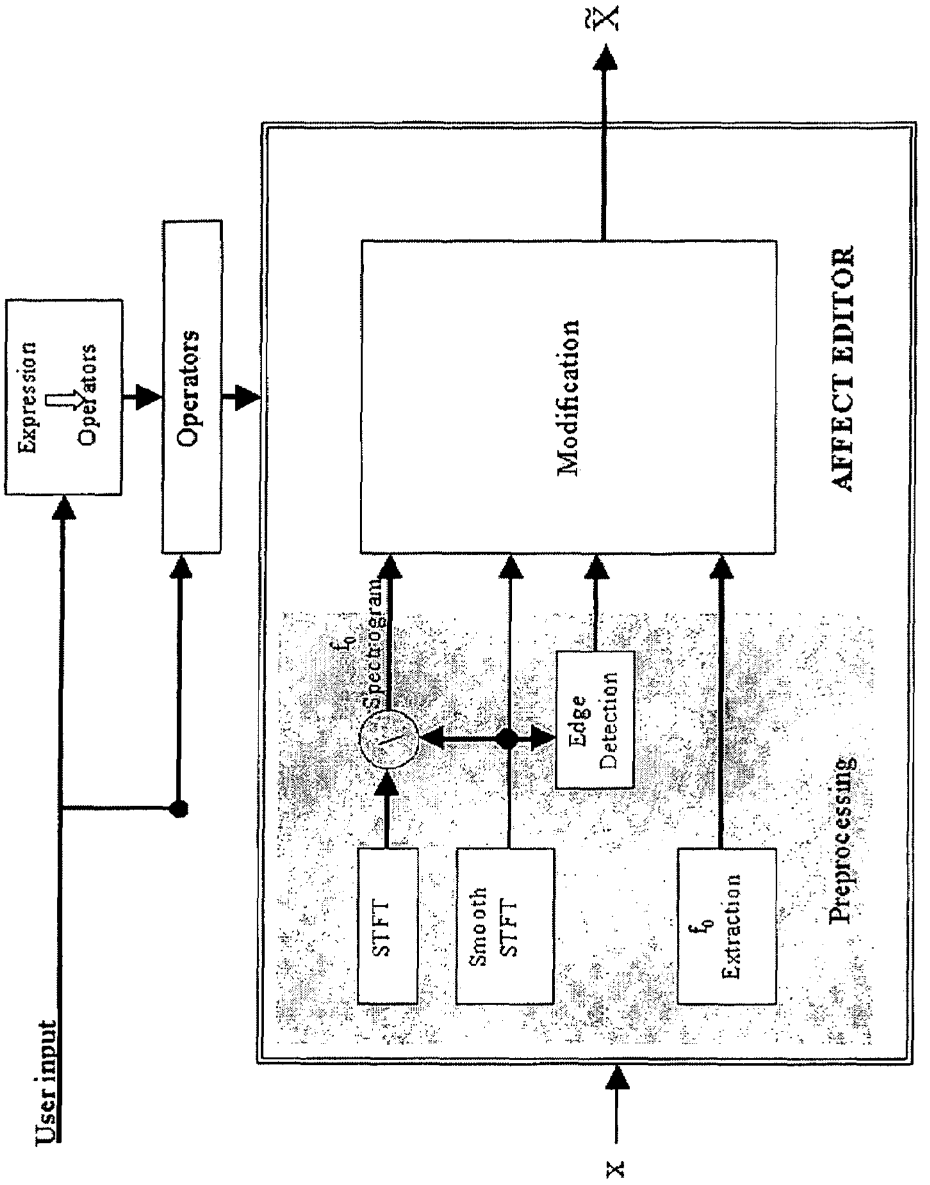
FIG. 1 shows a schematic diagram of an affect editing system, which may be implemented on a workstation.

The affect editor, shown schematically in FIG. 1, takes an input speech signal X, and allows the user to modify its conveyed expression, in order to produce an output signal $\tilde{X}$, with a new expression. The expression can be an emotion, mental state or attitude. The modification can be a nuance, or might be a radical change. The operators that affect the modifications are set by the user. The editing operators may be derived in advance by analysis of an affective speech corpus. They can include a corpus of pattern samples for concatenation, or target samples for morphing. A complete system may allow a user to choose either a desired target expression that will be automatically translated into operators and contours, or to choose the operators and manipulations manually. The editing tool preferably offers a variety of editing operators, such as changing the intonation, speech rate, the energy in different frequency bands and time frames, or the addition of special effects.

This system may also employ an expressive inference system that can supply operations and transformations between expressions and the related operators. Another preferable feature is a graphical user interface that allows navigation among expressions and gradual transformations in time.

The preferred embodiment of the affect editor is a tool that encompasses various editing techniques for expressions in speech. It can be used for both natural and synthesized speech. We present a technique that uses a natural expression in one utterance by a particular speaker for other utterances by the same speaker or by other speakers. Natural new expressions may be created without affecting the voice quality.

This system may also employ an expressive inference system that can supply operators and transformations between expressions and the related operators. Another preferable feature is a graphical user interface that allows navigation among expressions and gradual transformations in time.

The editor employs a preprocessing stage before editing an utterance. In preferred embodiments post-processing is also necessary for reproducing a new speech signal. The input signal is preprocessed in a way that allows processing of different features separately. The method we use for preprocessing and reconstruction was described by Slaney (Slaney M., Covell M., Lassiter B.: Automatic Audio Morphing (ICASSP96), Atlanta, 1996, 1001-1004) who used it for speech morphing. It is based on analysis in the time-frequency domain. The time-frequency domain is used because it allows for local changes of limited durations, and of specific frequency bands. From human computer interaction point of view, it allows visualization of the changeable features, and gives the user graphical feedback for most operations. We also use a separate $f_0$ extraction algorithm, so a contour can be seen and edited. These features also make it a helpful tool for the psycho-acoustic research of features' importance. The pre-processing stages are described in Algorithm 1:

Pre-Processing Speech Signals for Editing

1. Short Time Fourier Transform, to create a spectrogram.
2. Calculating the smooth spectrogram using Mel-Frequency Cepstral Coefficients (MFCC). The coefficients are computed by re-sampling a conventional magnitude spectrogram to match critical bands as measured by auditory perception experiments. After computing logarithms of the filter-bank outputs, a low dimensional cosine transform is computed. The MFCC representation is inverted to generate a smooth spectrogram for the sound which does not include pitch.

3. Divide the spectrogram by the smooth spectrogram, to create a spectrogram of $f_0$.
4. Extracting $f_0$. This stage simplifies the editing of $f_0$ contour.
5. Edge detection on the spectrogram, in order to find significant patterns and changes, and to define time and frequency pointers for changes. Edge detection can also be done manually by the user.

Algorithm 1: Pre-Processing Speech Signals for Editing

The pre-processing stage prepares the data for editing by the user. The affect editing tool allows editing of an $f_0$ contour, spectral content, duration, and energy. Different implementation technique can be used for each editing operation, for example:

1. Changing the intonation. This can be implemented by mathematical operations, or by using concatenation. Another method for changing intonation is to borrow $f_0$ contours from different utterances of the same speaker and other speakers. The user may change the whole $f_0$ contour, or only parts of it.
2. Changing the energy in different frequency ranges and time-frames. The signal is divided into frequency bands that relate to the frequency response of the human ear. A smooth spectrogram that represents these bands is generated in the pre-processing stage. Changes can then be made in specific frequency bands and time-frames, or over the whole signal.
3. Changing the speech rate. Extend and shrink the duration of speech parts by increasing and decreasing the overlap between frames in the inverse short time Fourier transform. This method works well for the voiced parts of the speech, where $f_0$ exists, and for silence. The unvoiced parts, where there is speech but no $f_0$ contour, can be extended by interpolation.

These changes can be done on parts of the signal or on all of it. As will be shown below, operations on the pitch spectrogram and on the smooth/spectral spectrogram are almost orthogonal in the following sense. If one modifies only one of the spectrograms and then calculate the other from the reconstructed signal it will have minimal or no variations compared to the one calculated from the original signal. The editing tool has built-in operators and recorded speech samples. The recorded samples are for borrowing expression parts, and for simplifying imitation of expressions. After editing, the system has to reconstruct the speech signal. Post-processing is described in Algorithm 2.

Post-Processing for Reconstruction of a Speech Signal after Editing

6. Regeneration of the new full spectrogram by multiplying the modified pitch spectrogram with the modified smooth spectrogram.
7. Spectrogram inversion, as suggested by Griffin and Lim [2].

Algorithm 2: Post-Processing for Reconstruction of a Speech Signal after Editing.

Spectrogram inversion is the most complicated and time-consuming stage of the post-processing. It is complicated because spectrograms are based on absolute values, and do not give any clue as to the phase of the signal. The aim is to minimize the processing time in order to improve the usability, and to give direct feedback to the user.

This is just one example of many editing techniques that can be integrated in the speech editor tool, as provided for example by text and image processing tools.

Affect Editing

In this section we show some of the editing operations, with a graphical presentation of the results. We were able to determine that an affect editor is feasible with current technology. The goals were to determine whether we could obtain new speech signals that sound natural and convey new or modified expressions, and to experiment with some of the operators. We examined basic forms of the main desired operations, including changing $f_0$ contour, changes of energy, spectral content, and speech rate. For our experiment we used recordings of 15 people speaking Hebrew. Each speaker was recorded uttering repeatedly the same two sentences during a computer game, with approximately a hundred iterations each. The game elicited natural expressions and subtle expressions. It also allowed tracking of dynamic changes among consecutive utterances.

Figure 2:
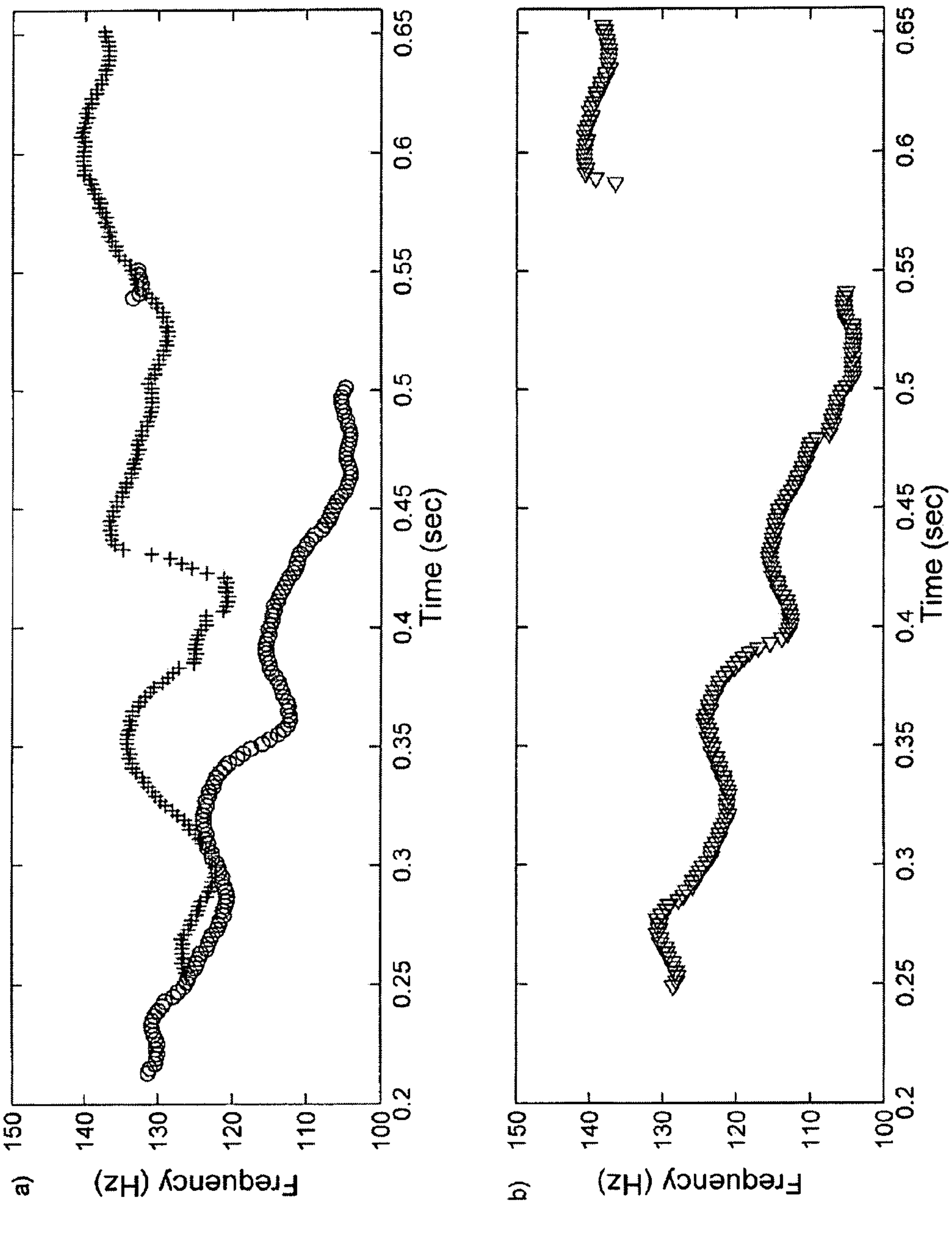
FIG. 2 shows fundamental frequency ($f_0$) curves of 'sgor de-let' a) original curves, the upper curve has 'uncertainty', the lower curve 'determination'; b) the curve of the edited signal, with combined pitch curve, and the energy and spectral content of 'uncertainty'.

FIG. 2 presents features of the utterances ‘sgor de-let’ which means in Hebrew ‘close the door’, uttered by a male speaker. FIG. 2*a* represents the fundamental frequency curves of two original utterances. The higher curve shows the expression of uncertainty, and the lower curve shows determination. The uncertainty curve is long, high, and has a mildly ascending slope, while the determination curve is shorter and has a descending slope. FIG. 2*b* represents the curve of the edited utterance of uncertainty, with the combined $f_0$ curve generated from the two original curves, after reconstruction of the new edited signal. The first part of the original uncertainty curve, between 0.25 sec and 0.55 sec, was replaced by the contour from the determination curve. The location of the transformed part and its replacement were decided using the extracted $f_0$ curves. The related parts from the $f_0$ spectrograms were replaced. A spectrogram of the new signal was generated by multiplying the new $f_0$ spectrogram by the original smoothed energy spectrogram. The combined spectrogram was then inverted. The energy and spectral content remained as in the original curve.

This manipulation yields a new and natural-sounding speech signal, with a new expression, which is the intended result. We have intentionally chosen an extreme combination in order to show the validity of the editing concept. An end-user is able to treat this procedure similarly to ‘cut and paste’, or ‘insert from file’ commands. The user can use pre-recorded files, or can record the required expression to be modified.

Figure 3:
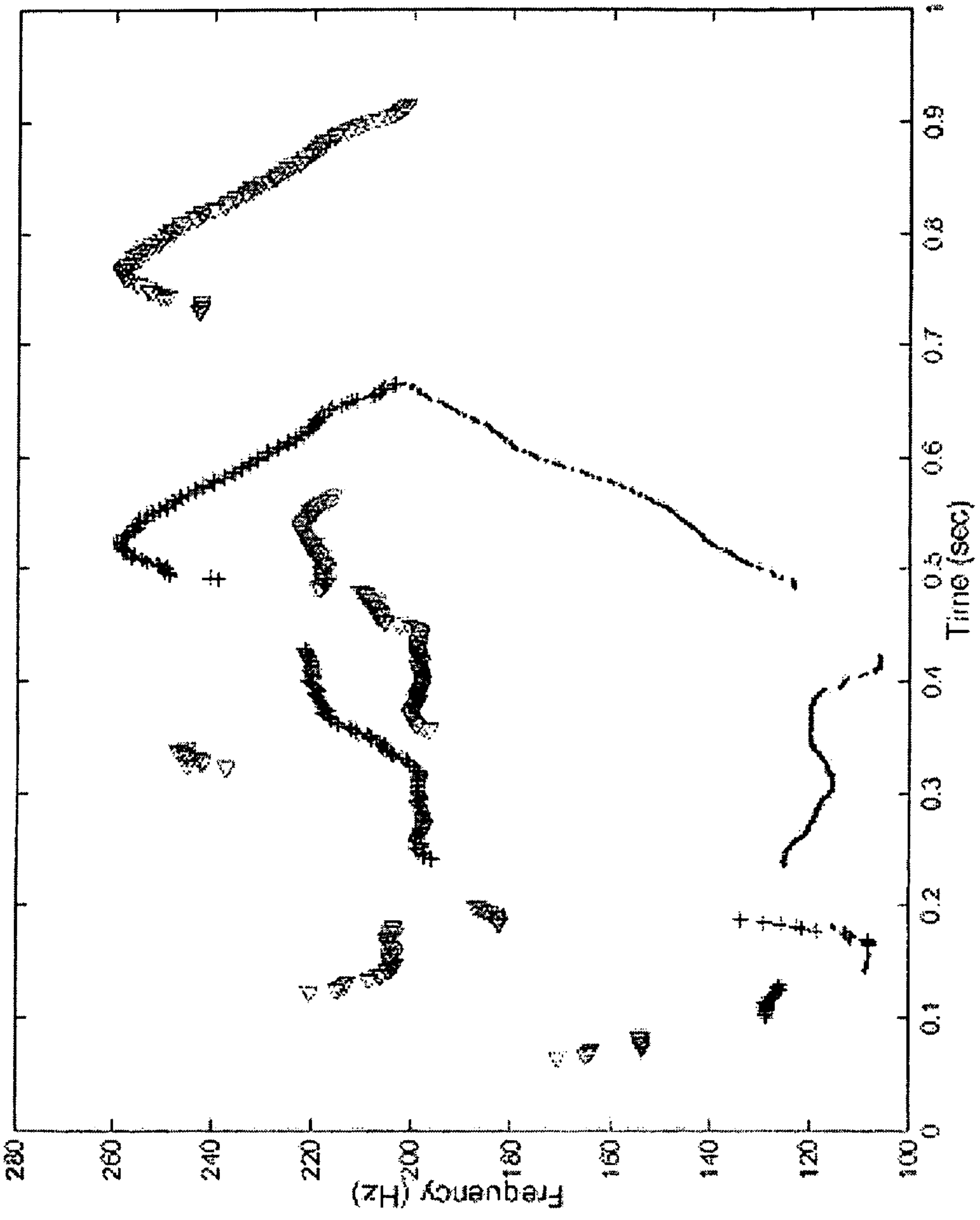
FIG. 3 shows $f_0$ contours of 'ptach delet zo' uttered by a female speaker (triangles), and a male speaker (dots), and the pitch of the edited male utterance (crosses)

FIG. 3 presents another set of operations, this time on the utterance ‘ptach de-let zo’, which means ‘open door this’ (open this door) in Hebrew. We manipulated local features of the fundamental frequency, as shown. We took an utterance by a male speaker, and replaced part of its $f_0$ contour with a contour of an utterance by a female speaker with a different expression, using the same technique as in the previous example. The pitch of the reconstructed signal is shown in crosses. As can be seen, both the curve shape and its duration were changed. The duration was extended by inverting the original spectrogram with a smaller overlap between frames. The sampling rate of the recorded signals was 32 KHz; the short-time Fourier transform, and the $f_0$ extraction algorithm used frames of 50 ms with original overlap of 48 ms, which allowed precision calculation of low $f_0$ and flexibility of duration manipulations. After changing the intonation, we took the edited signal and changed its energy by multiplying it by a Gaussian, so that the center of the utterance was multiplied by 1.2 and the sides the beginning and the end of the utterance, were multiplied by 0.8. The new signal sounds natural, with the voice of the male speaker. The new expression is a combination of the two original expressions.

The goal here was to examine editing operators to obtain natural-sounding results. We employed a variety of manipulations, such as replacing parts of intonation contours with different contours from the same speaker and from another speaker, changing the speech rate, and changing the energy by multiplying the whole utterance by a time dependent function. The results were new utterances, with new natural expressions, in the voice of the original speaker. These results were confirmed by initial evaluation with Hebrew speakers. The speaker was always recognized, and the voice sounded natural. On some occasions the new expression was perceived as unnatural for the specific person, or the speech rate too fast. This happened for utterances in which we had intentionally chosen slopes and $f_0$ ranges which were extreme for the edited voice. In some utterances the listeners heard an echo. This occurred when the edges chosen for the manipulations were not precise.

Using pre-recorded intonation contours and borrowing contours from other speakers enables a wide range of manipulations of new speakers' voices, and can add expressions that are not part of a speaker's normal repertoire. A relatively small reference database of basic intonation curves can be used for different speakers. Time-related manipulations, such as extending the shrinking durations, and applying time dependent functions, extend the editing scope even farther. The system allows flexibility and a large variety of manipulations and transformations and yields natural speech. Gathering these techniques and more under one editing tool, and defining them as editing operators creates a powerful tool for affect editing. However, to provide a full system which is suitable for general use the algorithms benefit in being refined, especially synchronization between the borrowed contours and the edited signal. Special consideration should be given to the differences between voiced (where there is $f_0$) and unvoiced speech. Usability aspects should also be addressed, including processing time.

We have described a system for affect editing for non-verbal aspects of speech. Such an editor has many useful applications. We have demonstrated some of the capabilities of such a tool for editing expressions of emotion, mental state and attitudes, including nuances of expressions and subtle expressions. We examined the concept using several operations, including borrowing $f_0$ contours from other speech signals uttered by the same speaker and by other speakers, changing speech rate, and changing energy in different time frames and frequency bands. We managed to reconstruct natural speech signals for speakers with new expressions. These experiments demonstrate the capabilities of this editing tool. Further extensions could include provision for real-time processing input from affect inference systems and labeled reference data for concatenation, an automatic translation mechanism from expressions to operators, and a user interface that allows navigation among expressions.

Further Information Relating to Feature Definition and Extraction

The method chosen for segmentation of the speech and sound signals into sentences was based on the modified Entropy-based Endpoint Detection for noisy environments, described by Shen (Zwicker, E., "Subdivision of the audible frequency range into critical bands (Frequenzgruppen)", Journal of the Acoustical Society of America 33. 248, 1961). This method calculates the normalized energy in the frequency domain, and then calculates entropy, as minus the product of the normalized energy and its logarithm. In this way, frequencies with low energy get a higher weight. It corresponds to both speech production and speech perception, because higher frequencies in speech tend to have lower energy, and require lower energy in order to be perceived.

In order to improve the location of end-points a zero-crossing rate calculation (Zwicker, E., Flottorp G. and Stevens S. S., "Critical bandwidth in loudness summation." Journal of the Acoustical Society of America 29. 548-57, 1957) was used at the edges of the sentences identified by the entropy-based method. It corrected the edge recognition by up to 10 msec in each direction. This method yielded very good results, recognizing most speech segments (95%) for men but it requires different parameters for men and for women.

Segmentation Algorithm:

Define:

- FFT length 512, Hamming window of length 512
- The signal is divided into frames x of 512 samples each, with overlap of 10 msec.
- The length of overlap in frames is: Overlap$=10e^{-3}\cdot f_{sampling}$ Short-term Entropy calculation, for every frame of the signal, x:

$$a=FFT(x\cdot \text{Window})$$

$$\text{Energy}=abs(a)^2$$

For non-empty frames the normalized energy and the entropy are calculated:

$$Energy_{norm}=\frac{\text{Energy}}{\sum_{frames}\text{Energy}}$$

$$\text{Entropy}=-\Sigma \text{energy}_{norm}\cdot\log(\text{energy}_{norm})$$

Calculate the entropy threshold, $\epsilon=1.0e-16$, $\mu=0.1$:

$$\text{MinEntropy}=\min(\text{Entropy})_{Entropy>\epsilon}$$

$$\text{Entropy}_{th}=\text{average}(\text{Entropy})+\mu\cdot\text{MinEntropy}$$

The parameters that affect the sensitivity of the detection are: μ—the entropy threshold, and the overlap between frames.

A speech segment is located in frames in which the Entropy>$\text{Entropy}_{th}$.

For each segment:

- Locate all short speech segment candidates and check if the can be unified with their neighbours. Otherwise, a segment shorter than 2 frames is not considered a speech segment. A short segment of silence in the middle of a speech segment becomes part of the speech segment.
- Check that the length of the segment is longer than the minimum sentence length allowed; 0.1537 sec.
- Calculate number of zero-crossing events at each frame ZC.
- Define threshold of zero crossing as 10% of the average ZC: $ZC_{th}=0.1\cdot\text{average}(ZC)$
- For each of the identified speech segment, check if the there are adjacent areas in which $ZC>ZC_{th}$. If there are, the borders of the segments move to the beginning and end as defined by the zero-crossing.

Algorithm 3: Segmentation

Psychological and psychoacoustic tests have examined the relevance of different features to the perception of emotions and mental states using features such as pitch range, pitch average, speech rate, contour, duration, spectral content, voice quality, pitch changes, tone base, articulation and energy level. The features most straightforward for automatic inference of emotions from speech are derived from the fundamental frequency, which forms the intonation, energy, spectral content, and speech rate. However additional features such as loudness, harmonies, (jitter, shimmer and rhythm may also be used. Jitter and shimmer are fluctuations in $f_0$ frequency and in amplitude respectively). However the accuracy of the calculation of these parameters is highly dependent on the recording quality, sampling rate and the time units and frame length for which they are calculated. Alternative features from a musical point of view are, for example, tempo, harmonies, dissonances and consonances; rhythm, dynamics, and tonal structures or melodies and the combination of several tones at each time unit. Other parameters include mean, standard deviation, minimum, maximum and range (equals maximum-minimum) of the pitch, slope and speaking rate, statistical features of pitch and of intensity of filtered signals. Our preferred features are set out below:

Fundamental Frequency

The central feature of prosody is the intonation. Intonation refers to patterns of the fundamental frequency, $f_0$, which is the acoustic correlate of the rate of vibrations of the vocal folds. Its perceptual correlate is pitch. People use $f_0$ modulation i.e. intonation in a controlled way to convey meaning.

There are many different extraction algorithms for the fundamental frequency. I examined two different methods for calculating fundamental frequency $f_0$, here referred to as pitch, an autocorrelation method with inverse Linear Prediction Code (LPC) and a cepstrum method. Both methods of pitch estimation gave very similar results in most cases. Paul Boersma's algorithm was used by him in the tool PRAAT which in turn is used for emotions analysis in speech and by many linguists for research of prosody and prosody perception. This was adopted to improve the pitch estimation. Paul Boersma pointed out that sampling and windowing cause problems in determining the maximum of the autocorrelation signal. His method therefore includes division by the autocorrelation of the window, which is used for each frame. The next stage is to find the best time-shift candidates in the autocorrelation, i.e. the maximum values of the autocorrelation. Different weight with strength, and given to voiced candidates and to unvoiced candidates. The next stage is to find an optimal sequence of pitch values for the whole sequence of frames, i.e. for the whole signal. This uses the Viterbi algorithm with different costs associated with transitions between adjacent voiced frames and with transitions between voiced and unvoiced frames (these weights depend partially on the shift between frames). It also penalizes transitions between octaves (frequencies twice as high or low).

The third method yielded the best results. However, it still required some adaptations. Speaker dependency is a major problem in automatic speech processing as the pitch ranges for different speakers can vary dramatically. It is often necessary to clarify the pitch manually after extraction. I have adapted the extraction algorithm to correct the extracted pitch curve automatically. The first attempt to adapt the pitch to different speakers included the use of three different search boundaries, of 300 Hz for men, 600 Hz for women and 950 Hz for children, adjusted automatically by the mean pitch value of the speech signal.

Although this has improved the pitch calculations, the improvement was not general enough. The second change considers the continuity of the pitch curves. It comprises several observed rules. First, the maximum frequency value for the (time shift) candidates (in the autocorrelation) may change if the current values are within a smaller or larger range. The lowest frequency default was set to 70 Hz, although automatic adaptation to 50 Hz was added, for extreme cases. The highest frequency was set to 600 Hz. Only very few sentences in the two datasets required a lower minimum value, mainly men who found it difficult to speak; a higher range, mainly children who were trying to be irritating.

Figure 4:
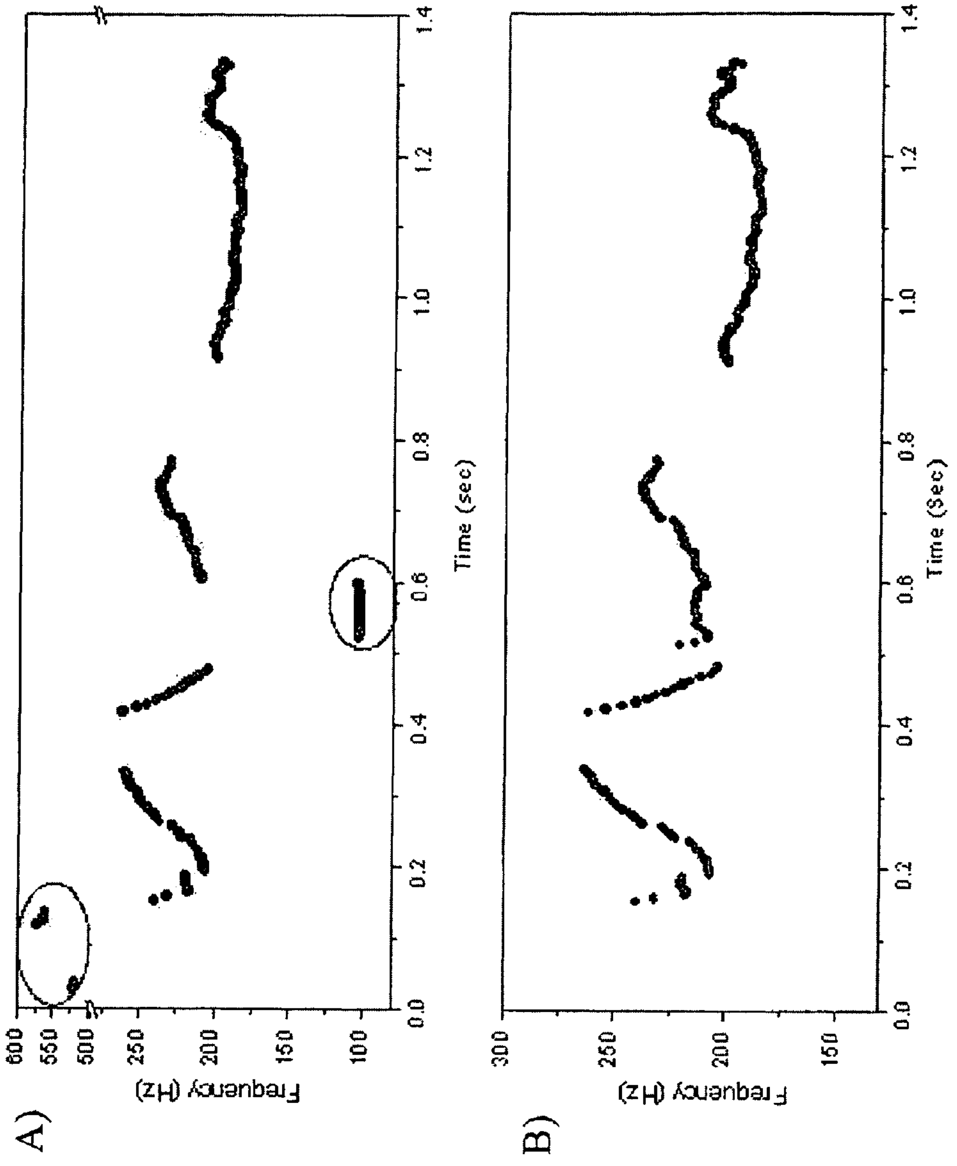
FIG. 4 shows a) Pitch extraction using the PRAAT, b) after modifications.

Second the weights of the candidates are changed if using other candidates with originally lower weights can improve the continuity of the curve. Several scenarios may cause such a change: First, frequency jumps between adjacent frames that exceed 10 Hz: In this case candidates that offer smaller jumps should be considered. Second, candidates exactly one octave higher or lower from the most probable candidate, with lower weights. In addition, in order to avoid unduly short segments, if voiced segments comprise no more than two consecutive frames, the weights of these frames are reduced. Correction is also considered for voiced segments that are an octave higher or lower than their surrounding voiced segments. This algorithm can eliminate the need of manual intervention in most cases, but is time consuming. Algorithm 4 describes the algorithm stage by stage. FIG. 4 shows two fundamental frequency curves, one as extracted by the original algorithm of the PRAAT, and the other with the additional modifications.

Another way used to describe the fundamental frequency at each point is to define one or two base values, and define all the other values according to their relation to these values. This use of intervals provides another way to code a pitch contour.

Fundamental Frequency Extraction Algorithm

Pre-Processing:

Set minimum expected pitch, minPitch, to 70 Hz

Set maximum expected pitch, MaxPitch, to 600 Hz

Divide the speech signal Signal into overlapping frames y of frame length, FrameLength, which allows 3 cycles of the lowest allowed frequency. $f_s$ is the sampling rate of the speech signal.

$$FrameLength = \frac{3 \cdot fs}{\min \text{Pitch}}$$

Set the shift between frames, FrameShift, to 5 msec.

I also tried shifts of 1, 2 and 10 msec. A shift of 5 msec gives a smoother curve than 1 msec and 2 msec, with less demands on memory and processing, while still being sufficiently accurate.

The window for this calculation, W, is a Hanning window. (The window specified in the original paper does not assist much, and should be longer than the length stated in the paper. It is not implemented in PRAAT).

Calculate $C_{WN}$, the normalized autocorrelation of the window. $C_W$ is the autocorrelation of the window; FFT length was set to 2048.

$$x_W = FFT(W) \quad \text{a.}$$

$$C_W = \text{real}(iFFT(abs(x_W)^2)) \quad \text{b.}$$

c.

$$c_{WN} = \frac{c_W}{\text{Max}(c_W)}$$

Short-term analysis. For each signal frame y of length FrameLength and step of FrameShift calculate:

1. Subtract the average of the signal in a frame from the signal amplitude at each sampling point.

$$y_n = y - \text{mean}(y)$$

2. Apply a Hanning window w to the signal in the frame, so that the centre of the frame has a higher weight than the boundaries.

$$a = y_n \cdot w$$

3. For each frame compute the autocorrelation $C_a$:

$$x = FFT(a)$$

$$c_a = \text{real}(iFFT(abs(x)^2))$$

4. Normalize the autocorrelation function:

$$c_N = \frac{c_a}{\text{Max}(c_a)}$$

5. Divide the total autocorrelation by the autocorrelation of the window:

$$c = \frac{c_N}{c_{WN}}$$

6. Find candidates for pitch from the autocorrelation signal—the first $N_{max}$ maxima values of the modified autocorrelation signal; N was set to 10.

$T_{max}$ are the frame numbers of the candidates $C_{(Tmax)}$ are the autocorrelation values at these points.

7. For each of the candidates, calculate parabolic interpolation with the autocorrelation points around it, in order to find more accurate maximum values of the autocorrelation.

Arrange indexes:

$$\text{if}\left(2 < T_{\max} < \frac{FrameLength}{2} \text{ AND } 0 < C_{(T_{\max})}\right) \text{ then}$$

$$i = (C_{(T_{\max})} - 1) \cdot N_{\max} + T_{\max}$$

$$j = \text{floor}\left(\frac{FrameLength}{2}\right) \cdot (T_{\max} - 1) + i$$

Interpolation:

$$T_{\max}(i) = T_{\max}(i) + \frac{C(j+1) - C(j-1)}{2 \cdot (2C(j) - C(j+1) - C(j-1))}$$

$$C_{\max}(i) = C_{\max}(i) + \frac{(C(j+1) - C(j-1))^2}{8 \cdot (2C(j) - C(j+1) - C(j-1))}$$

8. The frequency candidates are:

$$\text{Candidate} = \frac{f_s}{T_{\max}}$$

$$\text{If } C_{\max} > 1 \text{ then } CandidateWeight = \frac{1}{C_{\max}}$$

9. Check if the candidates' frequencies are within the specified range, and their weight is positive. If not, they become unvoiced candidates, with value 0.

10. Define the Strength of a frame as the weight of the signal in the current frame relative to all the speech signal (calculated at the beginning in the program)

$$\text{Strength} = \frac{\text{median(abs}(y))}{\text{Max(abs(Signal))}}$$

11. Calculate strength of both voiced and unvoiced candidates;

$V_{th}$-Voice threshold set to 0.45,$S_{th}$-Silence threshold 0.03 a. Calculate strength of unvoiced candidates, Wuv $$Wuv = \min\left(\left(V_{th} + \max\left(0, 2 - \text{Strength} \cdot \frac{(V_{th}+1)}{S_{th}}\right)\right), 1\right)$$

b. Calculate strength of voiced candidates, Wpc $$W_{PC} = CandidateWeight - 0.01 * \log_2\left(\frac{\text{min Pitch}}{\text{Candidate}}\right)$$

Calculate an optimal sequence of $f_0$ (pitch), for the whole utterance. Calculating for every frame, and every candidate in each frame, recursively, using M iterations; M=3.

I. viterbi algorithm: vu=0.14, vv=0.35

The cost for transition from unvoiced to unvoiced is zero.

The cost for transition from voiced to unvoiced or from unvoiced to voiced is $$VU * \frac{0.01}{FrameShift}$$

The cost for transition from voiced to voiced, and among octaves is:

$$VV \cdot \log_2 \frac{\text{Candidate}(m-1)}{\text{Candidate}(m)} \cdot \frac{0.01}{Frameshift}; \ m - \text{the frame number}$$

II. Calculate range, median, mean and standard deviation(std) for the extracted pitch sequence (the median is not as sensitive as mean to outliers).

III. If abs(Candidate−median)>1.5·std consider the continuity of the curve:

a. Consider frequency jumps to higher or lower octaves (f*2 or f/2), by equalizing the candidates' weights, if these candidates exist.

b. If the best candidate creates a frequency jumps of over 10 Hz, consider a candidate with jump smaller than 5 Hz, if exists, by equalizing the candidates' weights.

IV. Adapt to speaker. Change MaxPitch by factor 1.5, using the median, range and standard deviation of the pitch sequence:

if ((max(mean) OR MaxPitch)>median+2·*std*) AND $$\left(\frac{MaxPitch}{1.5} > \text{median} + std\right)$$

then $$MaxPitch = \frac{MaxPitch}{1.5}$$

V. For very short voiced sequences (2 frames), reduce the weight by half

VI. If the voiced part is shorter than the $n^{th}$ part of the signal length then: n=⅓ if $$\left(\text{mean} > \frac{2}{3} MaxPitch\right)$$

then MaxPitch=MaxPitch·1.5 else minPitch=50 Hz

Equalize weights for consecutive voiced segments in the utterance, among which there is an octave jumps Start a new iteration with the updated weights and values.

After M iterations, the expectation is to have a continuous pitch curve.

Algorithm 4: Algorithm for the Extraction of the Fundamental Frequency

In the second stage a more conservative approach was taken, using the Bark scale with additional filters for low frequencies. The calculated feature was the smoothed energy, in the same overlapping frames as in the general energy calculation and the fundamental frequency extraction. In this calculation the filtering was done in the frequency domain, after the implementation of short-time Fourier transform, using Slaney's algorithm (Slaney M., Covell M., Lassiter B.: Automatic Audio Morphing (ICASSP96), Atlanta, 1996, 1001-1004.

Another procedure for the extraction of the fundamental frequency, which includes an adaptation to the Boersma algorithm in the iteration stage (stage 10), is shown in Algorithm 5 below.

Alternative Fundamental Frequency Extraction Algorithm

>>>Pre-processing:

1. Divide the speech signal Signal into overlapping frames

>>>Short term analysis:

2. Apply a Hamming window to the signal in the frame, so that the centre of the frame has a higher weight then the boundaries.
3. For each frame compute the normalized autocorrelation
4. Divide the signal autocorrelation by the auto correlation of the window
5. Find candidates for the pitch from the normalized autocorrelation signal—the first N maxima values. Calculate parabolic interpolation with the autocorrelation points around it, in order to find more accurate maximum values of the auto correlation. Keep all candidates for harmonic properties calculation Algorithm 6

>>>Calculate in iteration an optimal sequence of $f_0$(pitch), for the whole utterance. Calculate for every frame, and every candidate in each frame, recursively, using the Viterbi algorithm. In each iteration, adjust the weights of the candidates according to:

6. Check if the candidates' frequencies are within the specific range, and their weights are positive. If not, they become unvoiced candidates, with frequency value 0.
7. Define the Strength as the relation between the average value of the signal in the frame and the maximal value of the entire speech signal. Calculate weights according to pre-defined threshold values and frame strengths for voiced and unvoiced candidates.
8. The cost for transition from voiced to unvoiced or from unvoiced to voiced.
9. The cost of transition from voiced to voiced, and among octaves
10. The continuity of the curve (adaptations to Boersma's algorithm): the adaptation is achieved by adapting the strength of a probable candidate to the strength of the leading candidate.
    a. Avoid frequency jumps to higher or lower octaves
    b. Frequency changes greater than 10 Hz
    c. Eliminate very short sequences of either voiced or unvoiced signal.
    d. Adapt to speaker by changing the allowed pitch range.

>>>After M iterations, the expectation is to have a continuous pitch curve.

Algorithm 5: Algorithm for the Extraction of the Fundamental Frequency.

Referring again to FIG. 4 the upper pitch extraction has ringed regions indicating outliers that require correction, the lower is after modification using algorithm 5.

Energy

The second feature that signifies expressions in speech is the energy, also referred to as intensity. The energy or intensity of the signal X for each sample i in time is:

$$\text{Energy}_i = X_i^2$$

The smoothed energy is calculated as the average of the energy over overlapping time frames, as in the fundamental frequency calculation. If X1 . . . XN defines the signal samples in a frame then the smoothed energy in each frame is (optionally, depending on the definition, this expression may be divided by Frame_length):

$$SmoothedEnergy_{Frame} = \sum_{i=1:N} X_i^2$$

The first analysis stage considered these two representations. In the second stage only the smoothed energy curve was considered, and the signal was multiplied by a window so that in each frame a larger weight was given to the centre of the frame. This calculation method yields a relatively smooth curve that describes the more significant characteristics of the energy throughout the utterance ($W_i$ denotes the window; optionally, depending on the definition, this expression may be divided by Frame_length):

$$SmoothedEnergy_{Frame} = \sum_{i=1:N} (X_i \cdot W_i)^2$$

Another related parameter that may also be employed is the centre of gravity:

$$\text{Centre\_of\_Gravity} = \frac{\int \text{Energy}_{frame}(t) \cdot t dt}{\int t dt}$$

Figure 5:
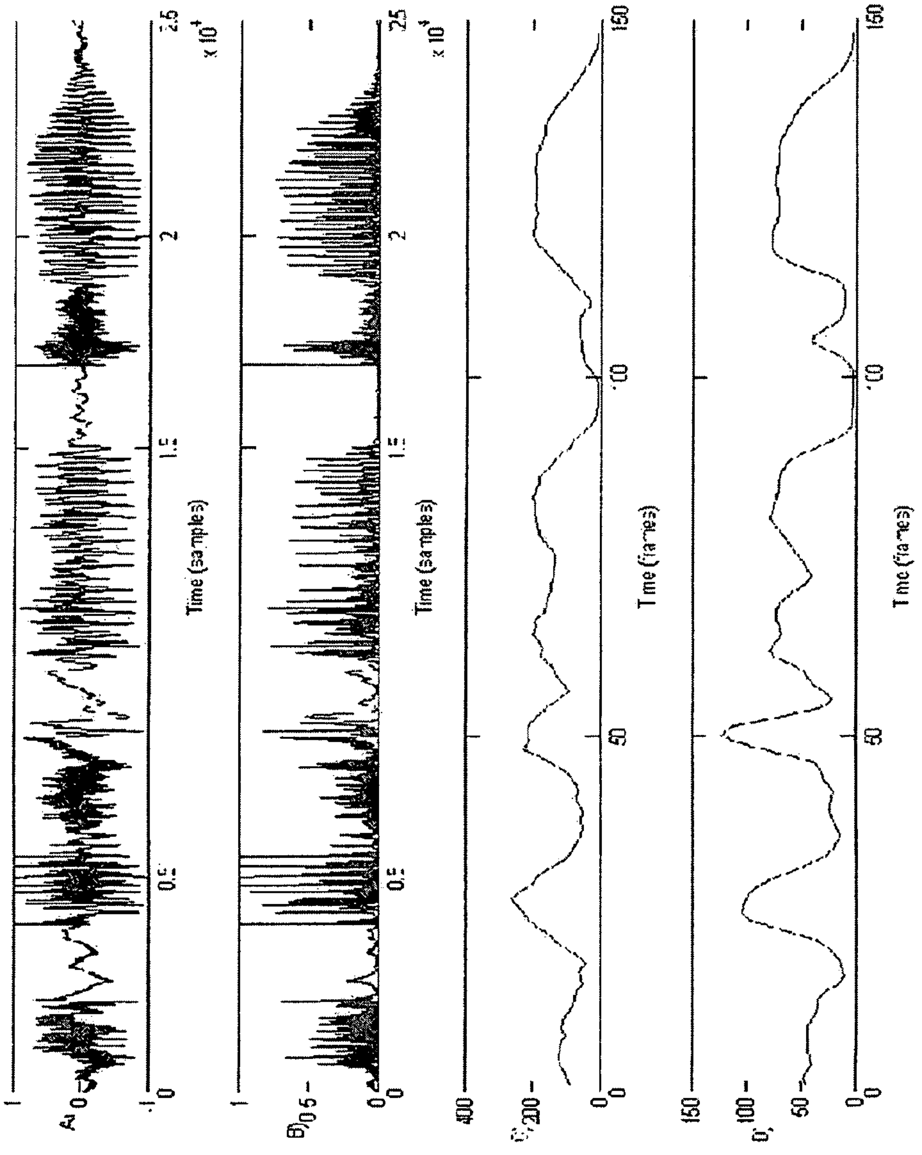
FIG. 5 shows different forms of energy calculations. a) speech signal, b) the energy of each sample, c) the energy of frames, d) the energy in frames when a Hanning window is applied.

Referring to FIG. 5 this shows a speech signal and the results of different energy calculations; the speech signal is shown in (A), its energy (B), the smoothed energy (averaged) (C) and smoothed energy with a window (D). It can be seen that the smooth curves (C and D) give the general behavior of the energy, or the contour of the energy, rather than rapid fluctuations that are more sensitive to noise, as in the energy calculation for each sample (B). The application of a window (D), emphasises the local changes in time, and follows more closely the original contour, as of the signal itself (A).

Spectral Content

Features related to the spectral content of speech signals are not widely used in the context of expressions analysis. One method for the description of spectral content is to use formants, which are based on a speech production model. I have refrained from using formants as both their definition and their calculation methods are problematic. They refer mainly to vowels and are defined mostly for low frequencies (below 4-4.5 kHz). The other method, which is the more commonly used, is to use filter-banks, which involves dividing the spectrum into frequency bands. There are two major descriptions of frequency bands that relate to human perception, and these were set according to psycho-acoustic tests—the Mel Scale and the Bark Scale, which is based on empirical observations from loudness summation experiments (Zwicker, E. "Subdivision of the audible frequency range into critical bands (Frequenzgruppen)", Journal of the Acoustical Society of America 33. 248, 1961; Zwicker, E., Flottorp G. and Stevens S. S. "Critical bandwidth in loudness summation.", Journal of the Acoustical Society of America 29.548-57, 1957). Both correspond to the human perception of sounds and their loudness, which implies logarithmic growth of bandwidths, and a nearly linear response in the low frequencies. In this work, the Bark scale was chosen because it covers most of the frequency range of the recorded signals (effectively 100 Hz-10 kHz). Bark scale measurements appear to be robust across speakers of differing ages and sexes, and are therefore useful as a distance metric suitable, for example, for statistical use. The Bark scale ranges from 1 to 24 and corresponds to the first 24 critical bands of hearing. The subsequent band edges are (in Hz) 0, 100, 200, 300, 400, 510, 630, 770, 920, 1080, 1270, 1480, 1720, 2000, 2320, 2700, 3150, 3700, 4400, 5300, 6400, 7700, 9500, 12000, 15500. The formula for converting a frequency f (Hz) into Bark is:

$$\text{Bark} = \arctan\left(\frac{0.76 \cdot f}{1000}\right) + 3.5 \cdot \arctan\left(\left(\frac{f}{7500}\right)^2\right)$$

Figure 6:
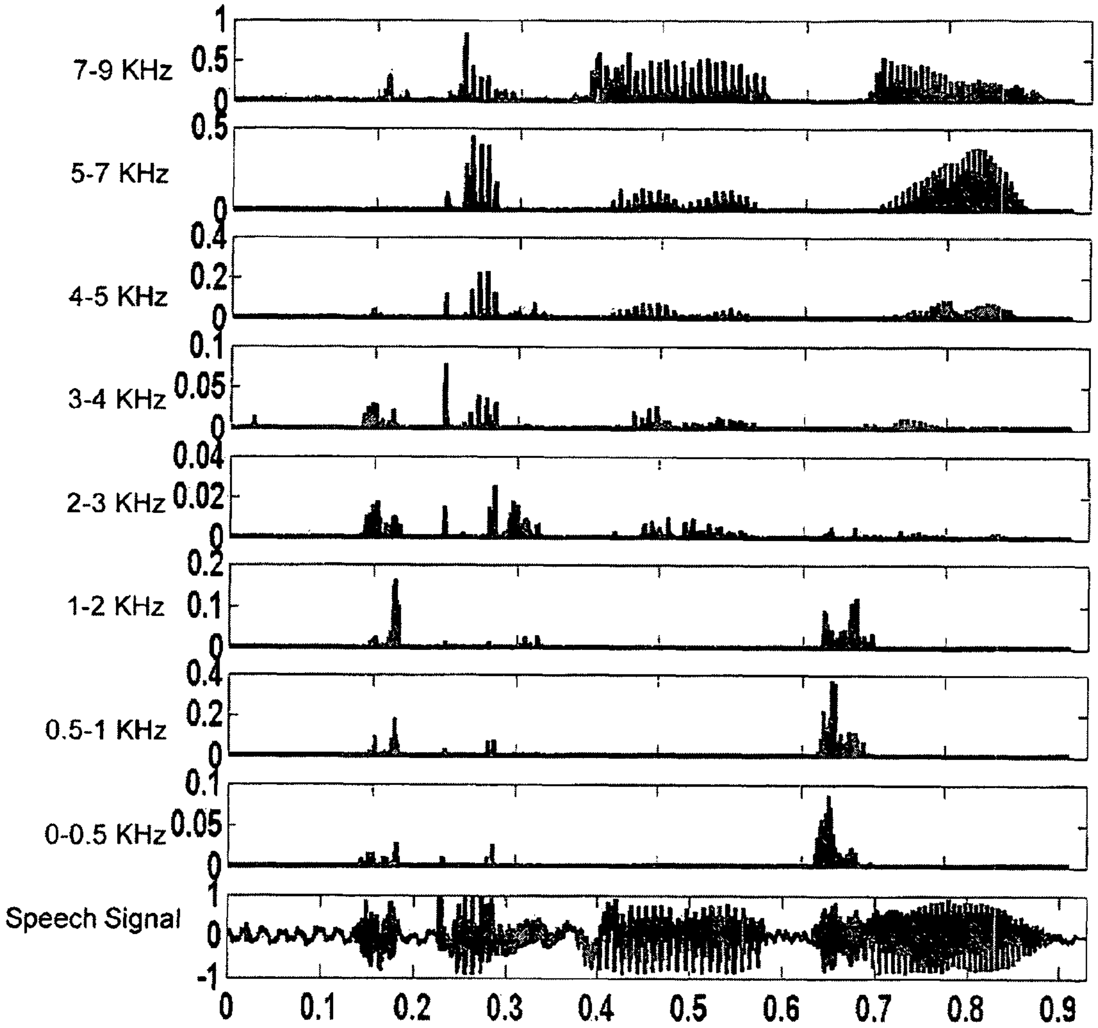
FIG. 6 shows a further graph of energy in different frequency bands: 0-500 Hz (band 1), 500-1000 Hz (band 2), 1-2 kHz (band 3), 2-3 kHz (band 4), 3-4 kHz (band 5), 4-5 kHz (band 6), 5-7 kHz (band 7), 7-9 kHz (band 8), and the speech signal at the bottom)

In this work, at the first stage, 8 bands were used. The bands were defined roughly according to the frequency response of the human ear, with wider bands for higher frequencies up to 9 kHz. FIG. 6 shows the energy in different bands of a speech signal using the eight bands. In the second stage the Bark scale up to 9 kHz was used.

Harmonic Properties

One of the parameters of prosody is voice quality. We can often describe voice with terms such as sharp, dull, warm, pleasant, unpleasant, and the like. Concepts that are borrowed from music can describe some of these characteristics and provide explanations for phenomena observed in the autocorrelation of the speech signal.

Figure 7:
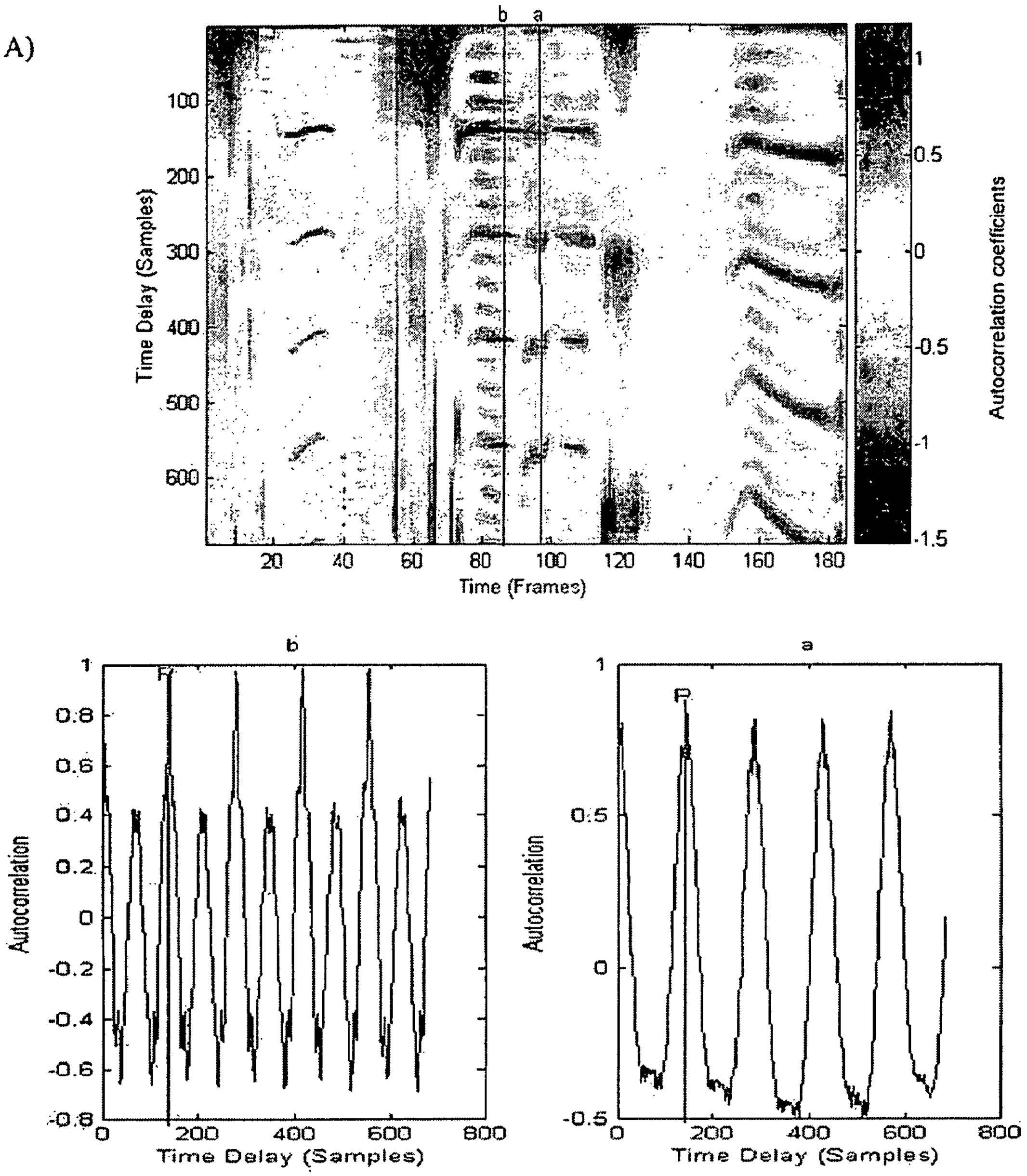
FIG. 7 shows (A) autocorrelation of a sentence uttered by a female speaker, calculated on overlapping time-frames and (B) the autocorrelation of specific time-frames from the speech signal in (A): a-pitch only, b-pitch and one significant harmonic interval which corresponds to ratio 3:2 to the $f_0$ frequency; the lines indicated by P denote the time delay of the pitch, i.e.

We have found that calculation of the fundamental frequency using the autocorrelation of the speech signal usually reveals several candidates for pitch, they are usually harmonies, multiplications of the fundamental frequency by natural numbers, as can be seen in FIGS. 7 and 8.

In expressive speech, there are also other maximum values, which are considered for the calculation of the fundamental frequency, but are usually ignored if they do not contribute to it. Interestingly, in many cases they reveal a behavior that can be associated with harmonic intervals, pure tones with relatively small ratio between them and the fundamental frequency, especially 3:2, as can be seen in FIG. 7 (the line indicated by b). Other intervals, such as 4:3 and more complicated patterns also appear, as can be seen for example in FIG. 8. These candidates do not exist in all speech signals, and can appear only in parts of an utterance. It seems as if these relations might be associated with the musical notations of consonance.

In other cases, the fundamental frequency is not very 'clean', and the autocorrelation reveals candidates with frequencies which are very close to the fundamental frequency. In music, such tones are associated with roughness or dissonance. There are other ratios that are considered unpleasant.

The main high-value peaks of the autocorrelation correspond to frequencies that are both lower and higher than the fundamental frequency, with natural ratios, such as 1:2, 1:3 and their multiples. In this work, these ratios are referred to as sub-harmonies, for the lower frequencies, and harmonies for the higher frequencies, intervals that are not natural numbers, such as 3:2 and 4:3 are referred to as harmonic intervals. Sub-harmonies can suggest how many precise repetitions of $f_0$ exist in the frame, which can also suggest how pure its tone is. (The measurement method limits the maximum value of detected sub-harmonies for low values of the fundamental frequency). I suggest that this phenomenon appears in the speech signals and may be related to the harmonic properties, although the terminology which is used in musicology may be different. One of the first applications of physical science to the study of music perception was Pythagoras' discovery that simultaneous vibrations of two string segments sound harmonious when their lengths form small integer ratios (e.g. 1:2, 2:3, 3:4). These ratios create consonance, blends that sound pleasant. Galileo postulated that tonal dissonance, or unpleasant, arises from temporal irregularities in eardrum vibrations that give rise to "ever-discordant impulses". Statistical analysis of the spectrum of human speech sounds show that the same ratios of the fundamental frequency are apparent in different languages. The neurobiology of harmony perception shows that information about the roughness and pitch of musical intervals is present in the temporal discharge patterns of the Type I auditory nerve fibres, which transmit information about sound from the inner ear to the brain. These findings indicate that people are built to both perceive and generate these harmonic relations.

The ideal harmonic intervals, their correlate in the 12 tones system of western music and their definitions as dissonances or consonances are listed in Table 1. The table also shows the differences between the values of these two sets of definition. These differences are smaller than 1%. the different scales may be approximations.

TABLE 1

Harmonic intervals, also referred to as just intonation, and their dissonance or consonance property, compared with equal temperament, which is the scale in western music. The intervals in both systems are not exactly the same, but they are very close.

| Number of Semitones | Interval Name | Consonant? | Intonation Ratios | Equal Temperament | Difference |
|---|---|---|---|---|---|
| 0 | unison | Yes | 1/1 = 1.000 | $2^{0/12} = 1.000$ | 0.0% |
| 1 | semitone | No | 16/15 = 1.067 | $2^{1/12} = 1.059$ | 0.7% |
| 2 | whole tone (major) | No | 9/8 = 1.125 | $2^{2/12} = 1.122$ | 0.2% |
| 3 | minor third | Yes | 6/5 = 1.200 | $2^{3/12} = 1.189$ | 0.9% |
| 4 | major third | Yes | 5/4 = 1.250 | $2^{4/12} = 1.260$ | 0.8% |
| 5 | perfect fourth | Yes | 4/3 = 1.333 | $2^{5/12} = 1.335$ | 0.1% |
| 6 | tritone | No | 7/5 = 1.400 | $2^{6/12} = 1.414$ | 1.0% |
| 7 | perfect fifth | Yes | 3/2 = 1.500 | $2^{7/12} = 1.498$ | 0.1% |
| 8 | minor sixth | Yes | 8/5 = 1.600 | $2^{8/12} = 1.587$ | 0.8% |
| 9 | major sixth | Yes | 5/3 = 1.667 | $2^{9/12} = 1.682$ | 0.9% |
| 10 | minor seventh | No | 9/5 = 1.800 | $2^{10/12} = 1.782$ | 1.0% |
| 11 | major seventh | No | 15/8 = 1.875 | $2^{11/12} = 1.888$ | 0.7% |
| 12 | octave | Yes | 2/1 = 2.000 | $2^{12/12} = 2.000$ | 0.0% |

When two tones interact with each other and the interval or ratio between their frequencies create a repetitive pattern of amplitudes, their autocorrelation will reveal the repetitiveness of this pattern. For example, minor second (16:15) and tritone (7:5=1.4, 45:32=1.40625 or 1.414, the definition depends on the system in use) are dissonances while perfect fifth (3:2) and forth (4:3) are consonances. Minor second is an example of two tones of frequencies that are very close to each other, and can be associated with roughness, perfect fourth and fifth create nicely distinguishable repetitive patterns, which are associated with consonances. Tritone, which is considered a dissonant, does not create such a repetitive pattern, while creating roughness (signals of too close frequencies) with the third and fourth harmonies (multiplications) of the pitch.

Consonance could be considered as the absence of dissonance or roughness. Dissonance as a function of the ratios between two pure tones can be seen in FIG. 9. The curve of the dissonance perception has a minimum at unison, rises fast to maximum and decays again. It rises faster as the lower frequency in the ratio is higher. However, there seem to be well-known and robust results regarding the perceived sense of intervals when two pure tones of different frequencies interact with each other.

Two tones are perceived as pleasant when the ear can separate them clearly and when they are in unison, for all harmonies. Relatively small intervals (relative to the fundamental frequency), are not well-distinguished and perceived as ‘roughness’. The autocorrelation of expressive speech signals reveals the same behavior, therefore I included the ratios as appeared in the autocorrelation to the extracted features, and added measures that tested their relations to the documented harmonic intervals.

The harmonies and the sub-harmonies were extracted from the autocorrelation maximum values. The calculation of the autocorrelation follows the sections of the fundamental frequency extraction algorithm (Algorithm 4, or preferably Algorithm 5), that describes the calculation of candidates. The rest of the calculation, which is described in Algorithm 6 is performed after the calculation of the fundamental frequency is completed:

Extracting Ratios

For the candidates calculated in Algorithm 5, do:

If Candidate>$f_0$ then it is considered as harmony, with ratio:

$$\text{harmonies} = \frac{\text{candidate}}{f_0}$$

Else, if Candidate<$f_0$ then it is considered as sub-harmony, with ratio:

$$\text{sub-harmonies} = \frac{f_0}{\text{candidate}}$$

For each frame all the Candidates and their weights, CandidateW eights, are kept.

Algorithm 6: Extracting Ratios: Example Definitions of ‘Harmonies’ and ‘Sub-Harmonies’.

The next stage is to check if the candidates are close to the known ratios of dissonances and consonances (Table 1), having established the fact that these ratios are significant. I examined for each autocorrelation candidate the nearest harmonic interval and the distance from this ideal value. For each ideal value I then calculated the normalized number of occurrences in the utterance, i.e. divided by the number of voiced frames in the utterance.

The ideal values for sub-harmonies are the natural numbers. Unfortunately, the number of sub-harmonies for low values of the fundamental frequencies is limited, but since the results are normalized for each speakers this effect is neutralised.

These features can potentially explain how people can distinguish between real and acted expressions, including the distinction between real and artificial laughter, including behavior that is subject to cultural display rules or stress. The distance of the calculated values from the ideal ratios may reveal the difference between natural and artificial expressions. The artificial sense may be derived from inaccurate transitions while speakers try to imitate the characteristics of their natural response.

I have determined that the harmonic related features are among the most significant features for distinguishing between different types of expressions.

Parsing

Time variations within utterances serve various communication roles. Linguists and especially those who investigate pragmatic linguistics use sub-units of the utterance for observations. Speech signals (the digital representation of the captured/recorded speech) can be divided roughly into several categories. The first is speech and silence, in which there are no speech or voice. The difference between them can be roughly defined by the energy level of the speech signal. The second category is voiced, where the fundamental frequency is not zero, i.e. there are vibrations of the vocal folds during speech, usually during the utterance of vowels, and unvoiced, where the fundamental frequency is zero, which happens mainly during silence and during the utterance of consonants such as /s/,/t/ and /p/, i.e. there are no vibrations of the vocal folds during articulation. The linguistic unit that is associated with these descriptions is the syllable, in which the main feature is the voiced part, which can be surrounded on one or both sides by unvoiced parts. The pitch, or fundamental frequency, defines the stressed syllable in a word, and the significant words in a sentence, in addition to the expressive non-textual content. This behavior changes among languages and accents.

In the context of non-verbal expressiveness, the distinction among these units allows the system to define characteristics of the different speech parts, and their time-related behavior. It also facilitates following temporal changes among utterances, especially in the case of identical text. The features that are of interest are somewhat different from those in the purely linguistic analysis, such features may include, for example the amount of energy in the stressed part compared to the energy in the other parts, or the length of the unvoiced parts.

Two approaches to parsing were tried. In the first I tried to extract these units using image processing techniques from spectrograms of the speech signals and from smoothed spectrograms. Spectrograms present the magnitude of the Short Time Fourier Transform (STFT) of the signal, calculated on (overlapping) short time-frames. For the parsing I used two dimensional (2D) edge detection techniques including zero crossing. However, most of the utterances were too noisy, and the speech itself has too many fluctuations and gradual changes so that the spectrograms are not smooth enough and do not give good enough results.

Parsing Rules

1. Define silence threshold as 5% of the maximum energy.
2. Locate peaks (location and value) of energy maximum value in the smoothed energy curve (calculated with window), that are at least 40 msec apart.
3. Delete very small energy peaks that are smaller than the silence threshold.
4. Beginning of sentence is the first occurrence of either the beginning of the first voiced part (pitch), or the point prior to an energy peak, in which the energy climbs above the silence threshold.
5. End of sentence is the last occurrence of either pitch or of the energy getting below the silence threshold.
6. Remove insignificant minimum values of energy between two adjacent maximum values (very short—duration valleys without a significant change in the energy. In a 'saddle' remove the local minimum and the smaller peak.)
7. Find pauses—look between two maximum peaks and find if the minimum is less than 10 percent of the maximum energy. If it is true then bracket it by the 10 percent limit. Do not do it if the pause length is less than 30 msec or if there is a pitch in that frame.

Algorithm 7: Parsing an Utterance into Different Speech Parts.

The second approach was to develop a rule based parsing. From analysis of the extracted features of many utterances from the two datasets in the time domain, rules for parsing were defined. These rules follow roughly the textual units. Several parameters were considered for their definition, including the smoothed energy (with window), pitch contour, number of zero-crossings, and other edge detection techniques.

Algorithm 7 (above) describes the rules that define the beginning and end of a sentence, finds silence areas and significant energy maximum values and locations. The calculation of secondary time-related metrics is then done on voiced part, where there are both pitch and energy, places in which there is energy (significant energy peaks) with no pitch, and on durations of silence or pauses.

Statistical and Time-Related Metrics

The vocal features extracted from the speech signal reduce the amount of data because they are defined on (overlapping) frames, thus creating an array for each of the calculated features. However, these arrays are still very long and cannot be easily represented or interpreted. Two types of secondary metrics have been extracted from each of the vocal features. They can be divided roughly into statistical metrics which are calculated for the whole utterance, such as maximum, mean, standard deviation, median and range, and to time-related metrics, which are calculated according to different duration properties of the vocal features and according to the parsing, and their statistical properties on occasions. It can be hard to find a precise manner to describe these relations mathematically as done in western music, and therefore it is preferable to use the extreme values of pitch at the locations of extreme values of the signal's energy, the relations between the values, durations and the distances (in time) between consecutive extreme values.

Feature Sets

I have examined mainly two sets of features and definitions. The first set, listed in Table 2 (below) was used for initial observations, and it was improved and extended to the a final version listed in Table 3 (below).

The final set includes the following secondary metrics of pitch: voiced length—the duration of instances in which the pitch is not zero, and unvoiced length, in which there is no pitch. Statistical properties of its frequency were considered in addition to up and down slopes of the pitch, i.e. the first derivative or the differences in pitch value between adjacent time frames. Finally, analysis of local extremum (maximum) peaks was added, including the frequency at the peaks, the differences in frequency between adjacent peaks (maximum-maximum and maximum-minimum), the distances between them in time and speech rate.

Similar examination was done for the energy (smoothed energy with window), including the value, the local maximum values, and the distances in time and value between adjacent local extreme values. Another aspect of the energy was to evaluate the shape of the energy peak, or how the energy changes in time. The calculation was to find the relations of the energy peaks to rectangles which are defined by the peak maximum value and its duration or length. This metric gives a rough estimate for the nature of changes in time and the amount of energy invested.

Temporal characteristics were estimated also in terms of 'tempo', or more precisely in this case, with different aspects of speech rate. Assuming, based on observations and music related literature that the tempo is set according to a basic duration unit whose products are repeated throughout an utterance, and this rate changes between expressions and different speech parts of the utterance. The assumption is that different patterns and combinations of these relative durations play a role in the expression.

The initial stage was to gather the general statistics and check if it is enough for inference, which proved to be the case. Further analysis should be done for accurate synthesis. The 'tempo' related metrics used here include the shortest part with pitch, that is the shortest segment around an energy peak that includes also pitch, the relative durations of silence to the shortest part, the relative duration of energy and no pitch and the relative durations of voiced parts.

TABLE 2

Extracted speech features, divided to pitch related features energy in time and energy in frequency bands. The ticked boxes signify which of the following was calculated for each extracted feature: mean, standard deviation, range, median, maximal value, relative length of increasing tendency, mean of 1st derivative positive values (up slope), mean of 1st derivative negative values (down slope), and relative part of the total energy.

| Feature # | Feature Name | mean | std | range | med | max | up | 1st positive derivative | 1st negative derivative | Relative part |
|---|---|---|---|---|---|---|---|---|---|---|
| | Pitch features | | | | | | | | | |
| 1 | Speech rate | | | | | | | | | |
| 2-3 | Voiced length | ✓ | ✓ | | | | | | | |
| 4-5 | Unvoiced length | ✓ | ✓ | | | | | | | |
| 6-13 | Pitch | ✓ | ✓ | ✓ | ✓ | ✓ | ✓ | ✓ | ✓ | |
| 14-17 | Pitch maxima | ✓ | ✓ | ✓ | ✓ | | | | | |
| 18-21 | Pitch minima | ✓ | ✓ | ✓ | ✓ | | | | | |
| 22-25 | Pitch extrema distances (time) | ✓ | ✓ | ✓ | ✓ | | | | | |
| | Energy features | | | | | | | | | |
| 26-29 | Energy | ✓ | ✓ | ✓ | ✓ | | | | | |
| 30-32 | Smoothed energy | | | | | | ✓ | ✓ | ✓ | |
| 33-36 | Energy maxima | ✓ | ✓ | ✓ | ✓ | | | | | |
| 37-40 | Energy maxima distances (time) | ✓ | ✓ | ✓ | ✓ | | | | | |
| | Energy in bands | | | | | | | | | |
| 41-45 | 0-500 Hz | ✓ | ✓ | ✓ | ✓ | | | | | ✓ |
| 46-50 | 500-1000 Hz | ✓ | ✓ | ✓ | ✓ | | | | | ✓ |
| 51-55 | 1000-2000 Hz | ✓ | ✓ | ✓ | ✓ | | | | | ✓ |
| 56-60 | 2000-3000 Hz | ✓ | ✓ | ✓ | ✓ | | | | | ✓ |
| 61-65 | 3000-4000 Hz | ✓ | ✓ | ✓ | ✓ | | | | | ✓ |
| 66-70 | 4000-5000 Hz | ✓ | ✓ | ✓ | ✓ | | | | | ✓ |
| 71-75 | 5000-7000 Hz | ✓ | ✓ | ✓ | ✓ | | | | | ✓ |
| 76-80 | 7000-9000 Hz | ✓ | ✓ | ✓ | ✓ | | | | | ✓ |

The harmonic related features include a measure of 'harmonicity', which in some preferred embodiments is measured by the sum of harmonic intervals in the utterance, the number of frames in which each of the harmonic intervals appeared (as in Table 1), the number of appearances of the intervals that are associated with consonance and those that are associated with dissonance and the sub-harmonies. The last group includes the filter bank and statistic properties of the energy in each frequency band. The centres of the bands are at 101, 204, 309, 417, 531, 651, 781, 922, 1079, 1255, 1456, 1691, 1968, 2302, 2711, 3212, 3822, 4554, 5412, 6414 and 7617 Hz. Although the sampling rate in both databases allowed for frequency range that reaches beyond 10 kHz, the recording equipment not necessarily does, therefore no further bands were employed.

TABLE 3

| Feature # | Name | Description | N° | mean | std | median | range | max | min |
|---|---|---|---|---|---|---|---|---|---|
| | Pitch | | | | | | | | |
| 1 | Speed rate | $\frac{\text{Voiced\_length}}{\text{Sentence\_length}}$ | | | | | | | |
| 2-3 | voiced length | $(\text{pitch\_ends}_n - \text{pitch\_starts}_n) \cdot \text{shift}$ | | ✓ | ✓ | | | | |
| 4-5 | unvoiced length | $(\text{pitch\_starts}_n - \text{pitch\_ends}_{n-1}) \cdot \text{shift}$ if there is an unvoiced part before the start of pith it is added | | ✓ | ✓ | | | | |
| 6-10 | Pitch value | Value of pitch when pitch > 0 | ✓ | | ✓ | ✓ | ✓ | ✓ | |
| 11-12 | up slopes | $(\text{pitch}_n - \text{pitch}_{n-1}) < 0$ | ✓ | | | ✓ | | | |
| 13-14 | down slopes | $(\text{pitch}_n - \text{pitch}_{n-1}) > 0$ | ✓ | | | ✓ | | | |
| 15-17 | max pitch | Maximum pitch values | | | ✓ | ✓ | ✓ | | |
| 18-20 | min pitch | Minimum pitch values (non zero) | | | ✓ | ✓ | ✓ | | |
| 21-23 | max jumps | Difference between adjacent maximum pitch values | | | ✓ | ✓ | ✓ | | |
| 24-26 | extreme jumps | Difference between adjacent extreme pitch values (maximum and minimum) | | | ✓ | ✓ | ✓ | | |
| 27-30 | max dist | Distances (time) between pitch peaks | | | ✓ | ✓ | ✓ | | ✓ |
| 31-34 | extreme dist | Distances (time) between pitch extremes | | | ✓ | ✓ | ✓ | | ✓ |
| | Energy | | | | | | | | |
| 35-38 | Energy value | Smoothed energy + window | | | ✓ | ✓ | ✓ | ✓ | |
| 39-41 | max energy | Value of energy at maximum peaks | | | ✓ | ✓ | ✓ | | |
| 42-44 | energy max jumps | Differences of energy value between adjacent maximum peaks | | | ✓ | ✓ | ✓ | | |
| 45-47 | energy max dist | Distances (time) between adjacent energy maximum peaks | | | ✓ | ✓ | ✓ | | |
| 48-50 | energy extr | Differences of energy value between | | | ✓ | ✓ | ✓ | | |
| | jumps | adjacent extreme peaks | | | ✓ | ✓ | ✓ | | |
| 51-53 | energy extr dist | Distances (time) between adjacent energy extreme peaks | | | ✓ | ✓ | ✓ | | |
| | 'Tempo' | | | | | | | | |
| 54 | shortest part with pitch | min(parts that have pitch) | | | | | | | |
| 55-58 | 'tempo' of silence | $\left(\frac{\text{Silence\_parts\_lengths}}{\text{shortest\_part}}\right)$ | | | ✓ | ✓ | ✓ | | ✓ |
| 59-62 | 'tempo' of energy and no pitch | $\left(\frac{\text{energy\_no\_pitch\_parts\_lengths}}{\text{shortest\_part}}\right)$ | | | ✓ | ✓ | ✓ | | ✓ |
| 63-66 | 'tempo' of pitch | $\left(\frac{\text{pitch\_parts\_lengths}}{\text{shortest\_part}}\right)$ | | | ✓ | ✓ | ✓ | | ✓ |
| 67-70 | resemblence of energy peaks to squares | $\left(\frac{\text{energy\_peak\_area}}{\text{peak\_max} \cdot \text{peak\_duration}}\right)$ | | | ✓ | ✓ | ✓ | | ✓ |
| | Harmonic properties | | | | | | | | |
| 71 | harmonicity | $\left(\frac{\text{number\_of\_harmonic\_parts}}{\text{length(pitch)}}\right)$ number of frames with pitch and harmonic interval | ✓ | | | | | | |
| 72-83 | harmonic intervals | Number of frames with each of the harmonic intervals | ✓ | | | | | | |
| 84 | consonance | Number of frames with intervals that are associated with consonance | ✓ | | | | | | |

TABLE 3-continued

| Feature # | Name | Description | N° | mean | std | median | range | max | min |
|---|---|---|---|---|---|---|---|---|---|
| 85 | dissonance | Number of frames with intervals that are associated with dissonance | ✓ | | | | | | |
| 86-89 | sub-harmonies | Number of sub-harmonies per frame | | | ✓ | ✓ | ✓ | ✓ | |
| | Filter-bank | | | | | | | | |
| 90-93 | central frequency | 101 Hz | | | ✓ | ✓ | ✓ | ✓ | |
| 94-97 | central frequency | 204 Hz | | | ✓ | ✓ | ✓ | ✓ | |
| 98-101 | central frequency | 309 Hz | | | ✓ | ✓ | ✓ | ✓ | |
| 102-105 | central frequency | 417 Hz | | | ✓ | ✓ | ✓ | ✓ | |
| 106-109 | central frequency | 531 Hz | | | ✓ | ✓ | ✓ | ✓ | |
| 110-113 | central frequency | 651 Hz | | | ✓ | ✓ | ✓ | ✓ | |
| 114-117 | central frequency | 781 Hz | | | ✓ | ✓ | ✓ | ✓ | |
| 118-121 | central frequency | 922 Hz | | | ✓ | ✓ | ✓ | ✓ | |
| 142-145 | central frequency | 1079 Hz | | | ✓ | ✓ | ✓ | ✓ | |
| 142-145 | central frequency | 1255 Hz | | | ✓ | ✓ | ✓ | ✓ | |
| 142-145 | central frequency | 1456 Hz | | | ✓ | ✓ | ✓ | ✓ | |
| 142-145 | central frequency | 1691 Hz | | | ✓ | ✓ | ✓ | ✓ | |
| 142-145 | central frequency | 1968 Hz | | | ✓ | ✓ | ✓ | ✓ | |
| 142-145 | central frequency | 2302 Hz | | | ✓ | ✓ | ✓ | ✓ | |
| 146-149 | central frequency | 2711 Hz | | | ✓ | ✓ | ✓ | ✓ | |
| 150-153 | central frequency | 3212 Hz | | | ✓ | ✓ | ✓ | ✓ | |
| 154-157 | Central frequency | 3822 Hz | | | ✓ | ✓ | ✓ | ✓ | |
| 158-161 | Central frequency | 4554 Hz | | | ✓ | ✓ | ✓ | ✓ | |
| 162-165 | Central frequency | 5412 Hz | | | ✓ | ✓ | ✓ | ✓ | |
| 166-169 | Central frequency | 6414 Hz | | | ✓ | ✓ | ✓ | ✓ | |
| 170-173 | Central frequency | 7617 Hz | | | ✓ | ✓ | ✓ | ✓ | |

No doubt many other effective alternatives will occur to the skilled person. It will be understood that the invention is not limited to the described embodiments and encompasses modifications apparent to those skilled in the art lying within the spirit and scope of the claims appended hereto.

What is claimed:

1. A speech affect processing system to enable a user to edit an affect content of a speech signal, the system comprising:

input to receive speech analysis data from a speech analysis system, said speech analysis data comprising a set of parameters representing said speech signal;

a user input to receive user input data defining one or more affect-related operations to be performed on said speech signal;

an affect modification system coupled to said user input and to said speech processing system to modify said parameters in accordance with said one or more affect-related operations and further comprising a speech reconstruction system to reconstruct an affect modified speech signal from said modified parameters; and an output coupled to said affect modification system to output said affect modified speech signal;

wherein said user input is configured to enable a user to define an emotional content of said modified speech signal, wherein said parameters include at least one metric of a degree of harmonic content of said speech signal, and wherein said affect related operations include an operation to modify said degree of harmonic content in accordance with said defined emotional content.

2. A speech affect processing system as claimed in claim 1 further comprising a speech signal input to receive a speech signal, and a said speech analysis system coupled to said speech signal input, and wherein said speech analysis system is configured to analyse said speech signal to convert said speech signal into said speech analysis data.

3. A speech affect processing system as claimed in claim 1 wherein said at least one metric defining a degree of harmonic content of said speech signal comprises a measure of an energy at one or more frequencies with a frequency ratio of n/m to a fundamental frequency of said speech signal, where n and m are integers.

4. A speech affect processing system as claimed in claim 2 wherein said speech analysis system is configured to performing one or more of $f_0$ extraction, spectrogram analysis, smoothed spectrogram analysis, $f_0$ spectrogram analysis, autocorrelation analysis, energy analysis, and pitch curve shape detection, and wherein said parameters comprise one or more of $f_0$, spectrogram, smooth spectrogram, $f_0$ spectrogram, autocorrelation, energy and pitch curve shape parameters.

5. A speech affect processing system as claimed in claim 2 wherein said speech analysis system includes a system to automatically segment said speech signal in time, and wherein said parameters are determined for successive segments of said speech signal.

6. A speech affect processing system as claimed in claim 1 wherein said user input data includes data defining at least one speech affect editing operation, said at least one speech editing operation comprising one or more of a cut, copy, and paste operation, and wherein said affect modification system is configured to perform a said speech affect editing operation by performing the at least one speech affect editing operation on said set of parameters representing said speech to provide an edited set of parameters and by applying said edited set of parameters to said speech signal to provide a said affect modified speech signal.

7. A speech affect processing system as claimed in claim 1 wherein said user input data comprises data for one or more speech expressions, further comprising a system coupled to said user input to convert said expressions into affect-related operations.

8. A speech affect processing system as claimed in claim 1 further comprising a graphical user interface to enable a user to provide said user input data, whereby said user is able to define the desired emotional content for said affect modified speech signal.

9. A speech affect processing system as claimed in claim 8 wherein said graphical user interface is configured to enable said user to display a portion of said speech signal represented as one or more of said set of parameters.

10. A speech affect processing system as claimed in claim 2 further comprising a speech input to receive a second speech signal, a speech analysis system to analyse said second speech signal and to determine a second set of parameters representing said second speech signal, and wherein said affect modification is configured to modify one or more of parameters representing said first speech signal using one or more of said second set of parameters such that said speech signal is modified to more closely resemble said second speech signal.

11. A speech affect processing system as claimed in claim 1 further comprising a system to map a parameter defining an expression to said speech signal.

12. A non-transitory computer readable medium having computer executable instruction for implementing the speech processing system of claim 1.

13. A speech affect processing system to enable a user to edit an affect content of a speech signal, the system comprising:

input to receive speech analysis data from a speech analysis system, said speech analysis data comprising a set of parameters representing said speech signal;

a user input to receive user input data defining one or more affect-related operations to be performed on said speech signal;

an affect modification system coupled to said user input and to said speech processing system to modify said parameters in accordance with said one or more affect-related operations and further comprising a speech reconstruction system to reconstruct an affect modified speech signal from said modified parameters; and an output coupled to said affect modification system to output said affect modified speech signal;

a speech signal input to receive a speech signal, and a said speech analysis system coupled to said speech signal input, and wherein said speech analysis system is configured to analyse said speech signal to convert said speech signal into said speech analysis data; and a data store storing voice characteristic data for one or more speakers, said voice characteristic data comprising, for one or more of said parameters, one or more of an average value and a standard deviation for the speaker, and wherein said affect modification system comprises a system to modify said speech signal using said one or more shared parameters such that said speech signal is modified to more closely resemble said speaker, such that speech from one speaker may be modified to resemble the speech of another person.

14. A speech affect processing system as claimed in claim 13 wherein said voice characteristic data includes pitch curve data.

15. A speech affect processing system to enable a user to edit an affect content of a speech signal, the system comprising:

input to receive speech analysis data from a speech analysis system, said speech analysis data comprising a set of parameters representing said speech signal;

a user input to receive user input data defining one or more affect-related operations to be performed on said speech signal;

an affect modification system coupled to said user input and to said speech processing system to modify said parameters in accordance with said one or more affect-related operations and further comprising a speech reconstruction system to reconstruct an affect modified speech signal from said modified parameters; and an output coupled to said affect modification system to output said affect modified speech signal;

wherein said affect-related operations include an operation to modify a degree of content of one or both of musical consonance and musical dissonance of said speech signal.

16. A method of processing a speech signal to determine a degree of affective content of the speech signal, the method comprising:

inputting said speech signal into at least one computer system;

analyzing, at the at least one computer system, said speech signal to identify a fundamental frequency of said speech signal and frequencies with a relative high energy within said speech signal;

processing, at the at least one computer system, said fundamental frequency and said frequencies with a relative high energy to determine a degree of musical harmonic content within said speech signal; and using, at the at least one computer system, said degree of musical harmonic content to determine and output data representing a degree of affective content of said speech signal;

wherein said musical harmonic content comprises a measure of an energy at frequencies with a ratio of n/m to said fundamental frequency, where n and m are integers.

17. A method as claimed in claim 16 wherein said musical harmonic content further comprises a measure of one or more of a degree of consonance, a degree of dissonance, and a degree of sub-harmonic content of said speech signal.

18. A non-transitory computer readable medium having computer executable instructions to implement the method of claim 16.

19. A method of processing a speech signal to determine a degree of affective content of the speech signal, the method comprising:

inputting said speech signal into at least one computer system;

analyzing, at the at least one computer system, said speech signal to identify a fundamental frequency of said speech signal and frequencies with a relative high energy within said speech signal;

processing, at the at least one computer system, said fundamental frequency and said frequencies with a relative high energy to determine a degree of musical harmonic content within said speech signal; and using, at the at least one computer system, said degree of musical harmonic content to determine and output data representing a degree of affective content of said speech signal;

wherein said musical harmonic content comprises one or both of a measure of a relative energy in voiced energy peaks of said speech signal, and a relative duration of a voiced energy peak to one or more durations of substantially silent or unvoiced portions of said speech signal.

20. A method of processing a speech signal to determine a degree of affective content of the speech signal, the method comprising:

inputting said speech signal into at least one computer system;

analyzing, at the at least one computer system, said speech signal to identify a fundamental frequency of said speech signal and frequencies with a relative high energy within said speech signal;

processing, at the at least one computer system, said fundamental frequency and said frequencies with a relative high energy to determine a degree of musical harmonic content within said speech signal;

using, at the at least one computer system, said degree of musical harmonic content to determine and output data representing a degree of affective content of said speech signal; and identifying, by the at least one computer system, a speaker of said speech signal using said output data representing a degree of affective content of said speech signal.

* * * * *